(12) United States Patent
Shah et al.

(10) Patent No.: US 10,699,163 B1
(45) Date of Patent: Jun. 30, 2020

(54) METHODS AND APPARATUS FOR CLASSIFICATION

(71) Applicant: Massachusetts Institute of Technology, Cambridge, MA (US)

(72) Inventors: Pratik Shah, Somerville, MA (US); Gregory Yauney, Ithaca, NY (US)

(73) Assignee: Massachusetts Institute of Technology, Cambridge, MA (US)

( * ) Notice: Subject to any disclaimer, the term of this patent is extended or adjusted under 35 U.S.C. 154(b) by 127 days.

(21) Appl. No.: 16/105,382

(22) Filed: Aug. 20, 2018

Related U.S. Application Data

(60) Provisional application No. 62/547,672, filed on Aug. 18, 2017.

(51) Int. Cl.
*G06K 9/00* (2006.01)
*G06K 9/62* (2006.01)

(52) U.S. Cl.
CPC .......... *G06K 9/6256* (2013.01); *G06K 9/627* (2013.01); *G06K 9/6263* (2013.01); *G06K 2209/05* (2013.01)

(58) Field of Classification Search
None
See application file for complete search history.

(56) References Cited

U.S. PATENT DOCUMENTS

| 8,314,377 | B2 | 11/2012 | Binner | |
|---|---|---|---|---|
| 8,958,630 | B1 * | 2/2015 | Gallup | G06K 9/6293 |
| | | | | 382/159 |
| 9,008,391 | B1 * | 4/2015 | Solanki | G16H 30/20 |
| | | | | 382/128 |
| 2004/0240716 | A1 | 12/2004 | de Josselin de Jong et al. | |
| 2007/0081712 | A1 * | 4/2007 | Huang | G06T 7/38 |
| | | | | 382/128 |
| 2007/0118399 | A1 * | 5/2007 | Avinash | G16H 10/60 |
| | | | | 705/2 |
| 2008/0170770 | A1 * | 7/2008 | Suri | A61B 8/12 |
| | | | | 382/128 |

(Continued)

OTHER PUBLICATIONS

Hou, L., et al., Patch-Based Convolutional Neural Network for Whole Slide Tissue Image Classification; published in 2016 IEEE Conference on Computer Vision and Pattern Recognition (CVPR), Jun. 2016.

(Continued)

*Primary Examiner* — Shervin K Nakhjavan
(74) *Attorney, Agent, or Firm* — Stephen R. Otis

(57) ABSTRACT

A human expert may initially label a white light image of teeth, and computer vision may initially label a filtered fluorescent image of the same teeth. Each label may indicate presence or absence of dental plaque at a pixel. The images may be registered. For each pixel of the registered images, a union label may be calculated, which is the union of the expert label and computer vision label. The union labels may be applied to the white light image. This process may be repeated to create a training set of union-labeled white light images. A classifier may be trained on this training set. Once trained, the classifier may classify a previously unseen white light image, by predicting union labels for that image. Alternatively, the items that are initially labeled may comprise images captured by two different imaging modalities, or may comprise different types of sensor measurements.

20 Claims, 11 Drawing Sheets

(56) References Cited

U.S. PATENT DOCUMENTS

| | | | |
|---|---|---|---|
| 2008/0292194 A1* | 11/2008 | Schmidt | G06T 7/0012 382/217 |
| 2010/0280793 A1 | 11/2010 | Wilhelm et al. | |
| 2012/0243757 A1* | 9/2012 | Funka-Lea | G06T 7/0002 382/131 |
| 2014/0212055 A1* | 7/2014 | Boriah | G06K 9/0063 382/224 |
| 2015/0030255 A1* | 1/2015 | Wu | G06K 9/00664 382/224 |
| 2015/0086091 A1* | 3/2015 | Rezaee | G06K 9/6224 382/128 |
| 2015/0248768 A1* | 9/2015 | Garnavi | G06T 7/10 382/180 |
| 2015/0268226 A1* | 9/2015 | Bhargava | G01N 33/5091 514/789 |
| 2016/0035093 A1* | 2/2016 | Kateb | A61B 5/0042 382/131 |
| 2016/0093048 A1* | 3/2016 | Cheng | G06K 9/6289 382/131 |
| 2016/0125601 A1 | 5/2016 | Wu et al. | |
| 2016/0140300 A1* | 5/2016 | Purdie | G16H 20/10 705/2 |
| 2016/0253466 A1* | 9/2016 | Agaian | G06N 3/0427 382/128 |
| 2017/0046825 A1* | 2/2017 | Xu | G06T 7/174 |
| 2017/0076438 A1* | 3/2017 | Kottenstette | G06K 9/00637 |
| 2017/0116744 A1* | 4/2017 | Abedini | G06T 7/0012 |
| 2018/0136332 A1* | 5/2018 | Barfield, Jr. | G06K 9/00805 |

OTHER PUBLICATIONS

Joseph, B., et al., Detection and quantification of dental plaque based on laser-induced autofluorescence intensity ratio values; published in Journal of Biomedical Optics, 20(4), Apr. 2015.

Kang, J., et al., Dental plaque quantification using mean-shift-based image segmentation; published in 2010 International Symposium on Computer, Communication, Control and Automation (3CA), May 2010.

Kromp, F., et al., Machine learning framework incorporating expert knowledge in tissue image annotation; published in 2016 23rd International Conference on Pattern Recognition (ICPR), Dec. 2016.

Mansoor, A., et al., A statistical modeling approach to computer-aided quantification of dental biofilm; published in IEEE Journal of Biomedical Health Information, vol. 19, No. 1, pp. 358-366, Jan. 2015.

* cited by examiner

METHODS AND APPARATUS FOR CLASSIFICATION

RELATED APPLICATIONS

This application claims the benefit of U.S. Provisional Application No. 62/547,672 filed Aug. 18, 2017 (the "Provisional").

FIELD OF TECHNOLOGY

The present invention relates generally to classification.

COMPUTER PROGRAM LISTING

The following six computer program files are incorporated by reference herein: (1) create_patches_random_train.txt with a size of about 8 KB, created as an ASCII .txt file on Aug. 4, 2018; (2) create_patches_test.txt with a size of about 4 KB, created as an ASCII .txt file on Aug. 4, 2018; (3) interpretResults.txt with a size of about 13 KB, created as an ASCII .txt file on Jan. 19, 2018; (4) makeROC.txt with a size of about 2 KB, created as an ASCII .txt file on Aug. 4, 2018; (5) thresholdROCs.txt with a size of about 2 KB, created as an ASCII .txt file on Aug. 4, 2018; and (6) vgg_whitelight_cnn.txt with a size of about 13 KB, created as an ASCII .txt file on Aug. 4, 2018.

SUMMARY

In illustrative implementations, union labels (as defined herein) are employed in training a classifier, such as a convolutional neural network (CNN). The union labels are calculated by performing a union operation.

In some implementations, training a classifier with union labels may enable the classifier (once it is trained) to exploit knowledge from a first type of image in order to classify a second type of image. In other implementations, training a classifier with union labels may enable the classifier (once it is trained) to exploit knowledge from a first type of sensor measurement in order to classify a second type of sensor measurement.

In some implementations, each union label is created by performing a union operation as follows: A first image of a structure (e.g., tissue) may be captured by a first imaging modality and may be labeled, on a region-by-region basis, by a human expert. A second image of the same structure may be captured by a second imaging modality and may be labeled, on a region-by-region basis, by computer vision. In some cases, each region being labeled is a pixel, and thus the labeling for the first and second images is done on a pixel-by-pixel basis. In other cases, each region being labeled is a patch of multiple pixels, and thus the labeling for the first and second images is done on a patch-by-patch basis. For the first and second images, the classification may be binary, i.e., may have only two permitted classes. For instance, the two permitted classes may be 1 and 0, where 1 signifies "condition X is present" and 0 signifies "condition X is not present". The first and second images may then be registered, to cause the images to be aligned and to have the same scale. Union labels may then be created in such a way that, for each registered region (e.g., pixel or patch) of the two images, the union label for that region: (a) is "1" if the label for that region is "1" in the first image, or in the second image, or in both the first and second images; and (b) is "0" if the label for that region is "0" in both the first and second images.

In some implementations, the union labels are applied, on a region-by-region basis, to the first set of images which (as noted above) were captured by the first imaging modality and were initially labeled by human experts. A classifier (e.g., a CNN) may be trained on this union-labeled first set of images. After being trained, the classifier may classify a previously unseen image captured by the first imaging modality. When doing so, the trained classifier may, in effect, take into account features in the previously unseen image (captured by the first imaging modality) which correspond to features in the second set of images (captured by the second imaging modality). These features in the previously unseen image may be so subtle that they would not be detectable by human experts.

Alternatively, in some implementations, the union labels are applied, on a region-by-region basis, to the second set of images which (as noted above) were captured by the second imaging modality and were initially labeled by computer vision. A classifier (e.g., a CNN) may be trained on this union-labeled second set of images. After being trained, the classifier may then classify a previously unseen image captured by the second imaging modality. When doing so, the trained classifier may, in effect, take into account features in the previously unseen image (captured by the second imaging modality) which correspond to features in the first set of images (captured by the first imaging modality).

Furthermore, the trained classifier may, when classifying a previously unseen image, exploit information contained in the expert labels that were used to create the union labels that were in turn employed in training.

Here is a non-limiting example, in which union labels designate the presence (or absence) of dental plaque. In this example, two different sets of images are captured by two different imaging modalities, and then one set of images is labeled by human experts and the other set of images is labeled by computer vision.

Specifically, in this example: (a) the first set of images are white light images of teeth; (b) these white light images are captured by an RGB (red green blue) digital camera and are formed by white light; and (c) a human expert labels each pixel in these white light images with a label that indicates whether dental plaque is (or is not) present in the pixel. For instance, the human expert may use a digital "brush" to "paint" labels on pixels. The human expert may use the "brush" to label a pixel "1" if the expert thinks that dental plaque is present at the pixel and to label the pixel "0" if the expert thinks that dental plaque is not present at the pixel.

In this example: (a) the second set of images are filtered fluorescent images ("FF images") of teeth; (b) these FF images are formed by at least red fluorescent light that is emitted by porphyrins in response to excitation illumination and that is filtered by a 530 nm cut-on filter (to remove violet and blue light); (d) the porphyrins are produced by bacteria in dental plaque and thus the red fluorescent light that the porphyrins emit is a visual "signature" of dental plaque; and (d) a computer vision algorithm labels each pixel in these FF images with a label that indicates whether dental plaque is (or is not) present in the pixel. For instance, the computer vision algorithm may perform histogram thresholding of each FF image in such a way that: (a) each pixel (of that image) which has a recorded light intensity (in a specific color range) that exceeds a specified threshold is labeled "1' signifying "plaque present"; and (b) and each pixel (of that image) which has a recorded light intensity (in that specific color range) that is less than or equal to a specified threshold is labeled "0" signifying "plaque not present".

In this example, the first and second sets of images are then registered. For instance, each pair of images of a particular region of teeth (consisting of a white light image and a FF image) may be registered by calculating an affine transformation that includes one or more of rotation, scaling, and shearing.

In this example, union labels may be created in such a way that, for each pixel (in a pair of registered images that capture an image of the same object), the union label for that pixel: (a) is "1" if the label for that region is "1" in the white light image, in the FF image, or in both the white light and FF images; and (b) is "0" if the label for that region is "0" in both the white light and FF images.

In this example, the union labels may be applied, on a pixel-by-pixel basis, to the white light images that were initially labeled by human experts. A classifier (e.g., a CNN) may be trained on these union-labeled white light images. After being trained on the union-labeled images, the classifier may then classify a previously unseen white light image. When doing so, the trained classifier may, in effect, take into account features in the previously unseen, white light image which correspond to features in the FF ("FF") images. Human experts may ignore these features (e.g., if the human experts would miss the significance of features or if the features are too subtle to be seen by a human eye). Put differently, in this example, the trained classifier utilizes (among other things) knowledge acquired from FF images, when analyzing a previously unseen white-light image. Furthermore, the trained classifier may, when classifying the previously unseen white light image, exploit information contained in the expert labels that were used to create the union labels that were in turn employed in training.

Alternatively, in this example, the union labels may be applied, on a pixel-by-pixel basis, to the FF ("FF") images that were initially labeled by computer vision. A classifier (e.g., a CNN) may be trained on these union-labeled FF images. After being trained, the classifier may then classify a previously unseen FF image. When doing so, the trained classifier may, in effect, take into account features in the previously unseen FF image, which correspond to features in the white light images. Put differently, in this example, the trained classifier utilizes (among other things) knowledge acquired from white light images, when analyzing a previously unseen FF image. Furthermore, the trained classifier may, when classifying the previously unseen FF image, exploit information contained in the expert labels that were used to create the union labels that were in turn employed in training.

Alternatively, in this example, each of the labels may indicate the presence, or absence, of gingivitis.

In the preceding example, the two imaging modalities are white light images and filtered red light fluorescent images. However, this invention is not limited to these two specific imaging modalities.

In some implementations, any two imaging modalities may capture pairs of images, where each pair consists of two images of a particular object (e.g. a region of tissue), one image being captured by the first imaging modality and the second image being captured by the second imaging modality. These pairs of images may then be employed to create union labels, and then union-labeled images may be employed to train a classifier.

In some cases, the two imaging modalities comprise (a) an imaging technology with a specific contrast agent and (b) the same imaging technology without a contrast agent. Or the two imaging modalities may comprise (a) an imaging technology with a first contrast agent and (b) the same imaging technology with a second contrast agent. Or the two imaging modalities may comprise (a) an imaging technology with a specific tissue stain or dye; and (b) the same imaging technology without a tissue stain or dye. Or the two imaging modalities may comprise (a) an imaging technology with a first tissue stain or dye; and (b) the same imaging technology with a second tissue stain or dye. Or the two imaging modalities may comprise (a) an imaging technology with a first radionuclide and (b) the same imaging technology with a second radionuclide. Or the two imaging modalities may comprise (a) an imaging technology with a first radiotracer and (b) the same imaging technology with a second radiotracer. Or the two imaging modalities may comprise (a) an imaging technology with a first radioligand and (b) the same imaging technology with a second radioligand. Or the two imaging modalities may comprise two different imaging technologies which employ different hardware (e.g., MRI and CT).

In some implementations, the two images in a pair of corresponding images (one captured by the first imaging modality and the other captured by the second imaging modality) are each images of the same region of tissue.

In some cases, the two images which are registered are both 2D (two-dimensional) images. For instance, a 2D white light image of an unstained tissue biopsy slide may be registered with a 2D white light image of the same biopsy slide after the tissue has been stained with H&E (hematoxylin and eosin) stain. Or, for instance, a 2D PET (positron emission tomography) image of a "slice" of tissue may be registered with a 2D MRI (magnetic resonance imaging) image of the same "slice" of the same tissue. This registration may be performed in the same way that registration is performed in existing PET-MRI systems. Or, for instance, a 2D PET image of a "slice" of tissue may be registered with a 2D CT (x-ray computed tomography) image of the same "slice" of the same tissue. This registration may be performed in the same way that registration is performed in existing PET-CT systems.

Alternatively, in some cases, the two images which are registered are both 3D (three-dimensional) images. For instance, a 3D PET image of a 3D region of tissue may be registered with a 3D MRI image of the same 3D region of the same tissue. Or, for instance, a 3D PET image of a 3D region of tissue may be registered with a 3D CT image of the same 3D region of the same tissue.

In some cases, a classifier (which has been trained with union-labeled images): (a) determines that a region of an image is a member of a class; or (b) calculates a probability that a region of an image is a member of a class. Alternatively, a classifier (which has been trained on union labels) may calculate a degree of membership (in fuzzy set terminology) regarding the degree to which a region of an image is a member of a fuzzy set.

In some cases, a classifier (which has been trained with union-labeled images) performs a binary classification. For instance, in some cases: (a) the classifier classifies a region of an image to be either "X" or "not X", where these are the only two permitted classes; or (b) the classifier determines the probability that the region is "X", where the only permitted classes are "X" and "not X".

In some cases, a classifier (which has been trained with union-labeled images) classifies with more than two permitted classes. For instance, in some cases: (a) the classifier classifies a region of an image to be either "X", "Y" or "Z", but only one of these classes at a time; or (b) the classifier determines the probability that the region is "X", the probability that the region is "Y" or the probability that the region is "Z", where the only permitted classes are "X", "Y" and "Z".

In some cases, a classifier (which has been trained with union-labeled images) classifies an item as being simultaneously in multiple classes. For instance, in some cases, the classifier classifies a region of an image to be simultaneously both "X" and "Y".

In some cases, more than two imaging modalities are employed. For instance, there may be two, three, four, five, six or more imaging modalities.

In some implementations of this invention: (a) X different types of imaging modalities are employed, where X≥2; (b) registration is performed in such a way that, after registration, the images captured by the X types of imaging modalities comprise groups of registered images where all of the images in each particular group are registered with each other and are images of the same physical object; (c) each group of registered images includes X images, one per type of imaging modality; and (d) for each specific group of registered images, the union label for a region (e.g., a pixel or patch) is the union of the initial labels for that region. For instance, in some cases, if a group of registered images includes images captured by only three types of imaging modalities and the initial labels for a specific pixel (in that group of registered images) are "1" for the first imaging modality, "0" for the second imaging modality, and "0" for the third imaging modality, then the union label for that specific pixel is "1". Likewise, in some cases, if a group of registered images includes images captured by only three types of imaging modalities and the initial labels for a particular pixel (in that group of registered images) are "0" for the first imaging modality, "0" for the second imaging modality, and "0" for the third imaging modality, then the union label for that particular pixel is "0". In some cases: (a) images captured by at least one of the X types of imaging modalities are initially labeled by a human expert; and (b) images captured by at least one other of the X types of imaging modalities are initially labeled by a computer algorithm (e.g., a computer vision algorithm).

In some implementations, each union label is calculated as the inclusive disjunction (or equivalently, Boolean OR) of multiple other labels. For instance, in some cases: (a) the only permitted values of a first label are "0" and "1" and the only permitted values of a second label are "0" and "1"; and (b) a union label is calculated as being equal to the inclusive disjunction (or, equivalently, Boolean OR) of the first and second labels.

This invention is a major improvement to prior technology. In illustrative implementations, this invention solves at least the following two technological problems: (1) the inability of conventional technology to gain the benefit of information acquired from images captured by a first imaging modality, while viewing only a previously unseen image captured by a second imaging modality, where the first imaging modality is different than the second imaging modality; and (2) the inability of conventional technology to gain the benefit of information acquired from measurements by a first type of sensor, when presented with only a previously unseen measurement by a second type of sensor, where the first type of sensor is different than the second type of sensor. In some implementations, this invention solves these two technological problem by employing a union-label trained classifier, as described herein.

As used herein, a "pre-training image" means an image, the labels of which are used to help create union labels.

This invention has many practical benefits such as, in some cases (a) using only a low radiation dose imaging method, while exploiting information acquired from pre-training images captured by a high radiation dose imaging method; (b) using only a less expensive imaging method, while exploiting information acquired from pre-training images captured by a more expensive imaging method; or (c) using only a more widely available imaging method, while exploiting information acquired from a more scarcely available imaging method.

Reducing Exposure to Ionizing Radiation: In some implementations, images captured by a first imaging modality (which exposes a patient to little or no ionizing radiation) are classified in a way that exploits knowledge of pre-training images captured by another imaging method (which exposes patients to a higher dose of ionizing radiation). Thus, in some implementations of this invention, a patient gains the benefit of pre-training images captured by the imaging method with the higher ionizing radiation, without being exposed to that higher radiation imaging method. For instance, in some cases: (a) a CT scan would expose a patient to a higher dose of x-ray radiation than does an MRI; (b) a classifier is trained with union-labeled MRI images, where each union label is the union of a label for a region of a CT image and a label for the same region in an MRI image; (c) a new MRI image is captured; and (d) the trained classifier is able to classify this new MRI image, in a manner that exploits knowledge about pre-training images captured by CT. Thus, due to the trained classifier (which has been trained with union-labeled MRI images), the patient may get much of the benefit of a CT scan, without exposing the patient to the higher x-ray dose of a CT scan.

Likewise, in some implementations, a white light image of the surface of a tooth may be registered with an x-ray image of the same tooth. For instance, in some cases: (a) an x-ray of a tooth would cost more than a white light image of the tooth and would expose the patient to more ionizing radiation; (b) a classifier is trained with union-labeled white light images of teeth, where each union label is the union of a label for a region of a white light image and a label for the same region in an x-ray image; (c) a new white light image of a tooth is captured; and (d) the trained classifier is able to classify this white light image of a tooth, in a manner that exploits knowledge about pre-training x-ray images. Thus, due to the trained classifier (which has been trained with union-labeled white light images), the patient may get much of the benefit of a dental x-ray, at a lower cost and without exposing the patient to the ionizing radiation of a dental x-ray.

Reducing Cost and Need for Human Experts: In some implementations, a new, unlabeled image captured by a first imaging modality is classified in a way that exploits knowledge: (a) of pre-training images captured by another imaging method; and (b) of expert labels applied to pre-training images captured by the first imaging modality. For example, in some cases: (a) white light images of teeth are labeled by human experts; (b) this human expert labeling is expensive and difficult to provide on a mass scale; (c) FF images of teeth are initially labeled by computer vision; (d) a classifier is trained with union-labeled white light images, where each union label is the union of a human expert label for a pixel of a white light image and computer vision label for the same pixel in a FF image; (e) a new white light image is captured; and (f) the trained classifier classifies this new white light image. In the example in the preceding sentence, the patient may get much of the benefit of a FF image and of the expert labels, even though the trained classifier is classifying a new white light image that has not been labeled by a human expert.

In some implementations, union labels may be used to great advantage where (i) multiple imaging modalities are employed in order to create union labels, (b) each imaging modality is an independent way to detect a condition and (c) there is little overlap between the "positives" (presence of the condition) detected by the different imaging modalities. For instance, in the dental plaque example above, in some cases: (a) the FF images and white light images each detect some instances of plaque, but only a small minority of instances of plaque are detected by both the FF images and white light images; (b) the FF images do not detect a first subset of the plaque, because the first subset contains little or no porphyrins that emit red fluorescent light; and (c) the expert-labeled white light images do not detect a second subset of the plaque. Thus, in this dental plaque example, it is advantageous to train with union-labeled images, where the union label for a pixel is "positive" for plaque if either the white light image, FF image or both detect plaque at that pixel. Likewise, in some implementations, union labels may be used to great advantage where (i) multiple types of sensors are employed in order to create union labels, (b) each type of sensor is an independent way to detect a condition and (c) there is little overlap between the "positives" (presence of the condition) detected by the different types of sensors.

In some implementations, this invention may be employed: (a) to diagnose disease; (b) to perform patient stratification; or (c) to analyze or predict drug impact.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

The above Figures are not necessarily drawn to scale. The above Figures show some illustrative implementations of this invention, or provide information that relates to those implementations. The examples shown in the above Figures do not limit this invention. This invention may be implemented in many other ways.

DETAILED DESCRIPTION

Union Labels

Figure 1:
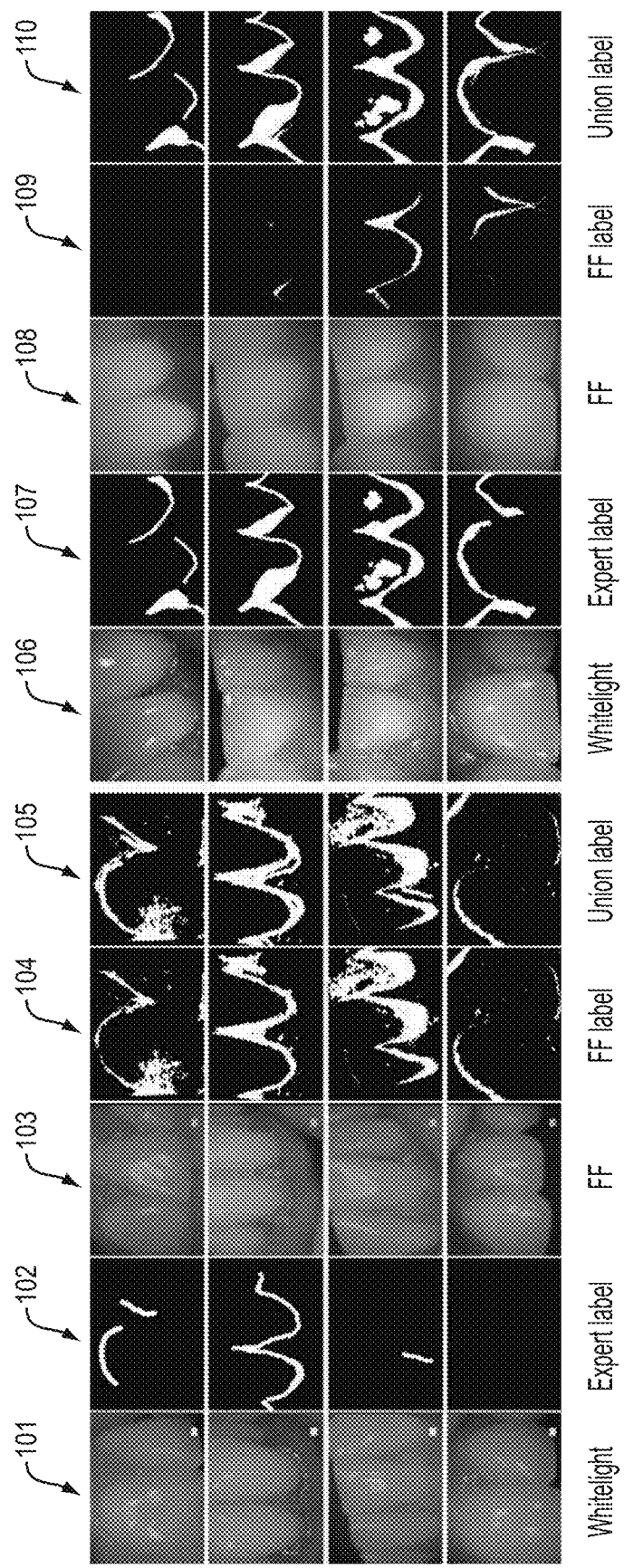
FIG. 1 shows union labels that are the union of human expert labels and computer vision labels.

FIG. 1 shows union labels that are the union of human expert labels and computer vision labels.

In the example shown in FIG. 1, dental plaque is present on portions of the surface of teeth. Human experts are often able to detect this dental plaque in white light images of the teeth, such as the white light images shown in columns 101 and 106 of FIG. 1. When stimulated by a 405 nm excitation light, porphyrins produced by this dental plaque emit red fluorescent light that may be filtered (to remove blue and violet light) and captured in filtered fluorescent ("FF") images, such as the FF images in columns 103 and 108 of FIG. 1. Thus, the red fluorescent light emitted by the porphyrins is a signature of (visual indicator for) dental plaque.

In FIG. 1, column 101 shows white light images of teeth. Column 102 shows labels that were applied by human experts to the white light images in column 101. Column 103 shows FF images of the same teeth as in column 101. Column 104 shows labels that were applied by computer vision to the FF images in column 103. Column 105 shows union labels that are the union of human expert labels in column 102 and computer vision labels in column 104.

Likewise, in FIG. 1, column 106 shows white light images of teeth. Column 107 shows labels that were applied by human experts to the white light images in column 106. Column 108 shows FF images of the same teeth as in column 106. Column 109 shows labels that were applied by computer vision to the FF images in column 108. Column 110 shows union labels that are the union of human expert labels in column 107 and computer vision labels in column 109.

In FIG. 1, columns 102, 104, 105, 107, 109, 110 each show binary labels, where white (or "1") means "dental plaque present" and black (or "0") means "dental plaque not present".

In FIG. 1, union labels are applied to each pair of registered images. The union labels are calculated in such a way that: (a) a union label applied to a pixel is black (indicating plaque not present) if both the expert label and computer vision label for that pixel are black; and (b) a union label applied to a pixel is white (indicating plaque present) if the expert label for that pixel is white, or if the computer vision label for that pixel is white, or if both the expert and computer vision labels for that pixel are white.

In FIG. 1, the union pixels are applied on a pixel-by-pixel basis, one union label for each image pixel. Alternatively, the union labels may be applied on a patch-by-patch basis, where each patch is a connected group of two or more pixels.

In any particular row of images in FIG. 1: (a) the teeth shown in column 101 in that row are the same as the teeth shown in column 103 in that row (before registration); (b) the teeth shown in column 106 in that row are the same as the teeth shown in column 108 in that row (before registration); (c) the union labels shown in column 105 in that row are the union of the human expert labels shown in column 102 in that row and the computer vision labels shown in column 104 in that row; and (c) the union labels shown in column 110 in that row are the union of the human expert labels shown in column 107 in that row and the computer vision labels shown in column 109 in that row.

In the example shown in FIG. 1, the plaque regions that the human experts detect overlap only partially with the plaque regions that the computer vision detects. Thus, in FIG. 1, a large proportion of the plaque regions that the human experts detect is not detected by computer vision, and vice versa. In FIG. 1, each union label labels a tooth region as containing plaque if a human expert, or computer vision, or both, has (or have) identified the region as containing plaque.

Alternatively, in FIG. 1: (a) gingivitis may be detected, instead of dental plaque; and (b) each label may indicate the presence of, or absence of, gingivitis.

Employing Union Labels

Figure 2:
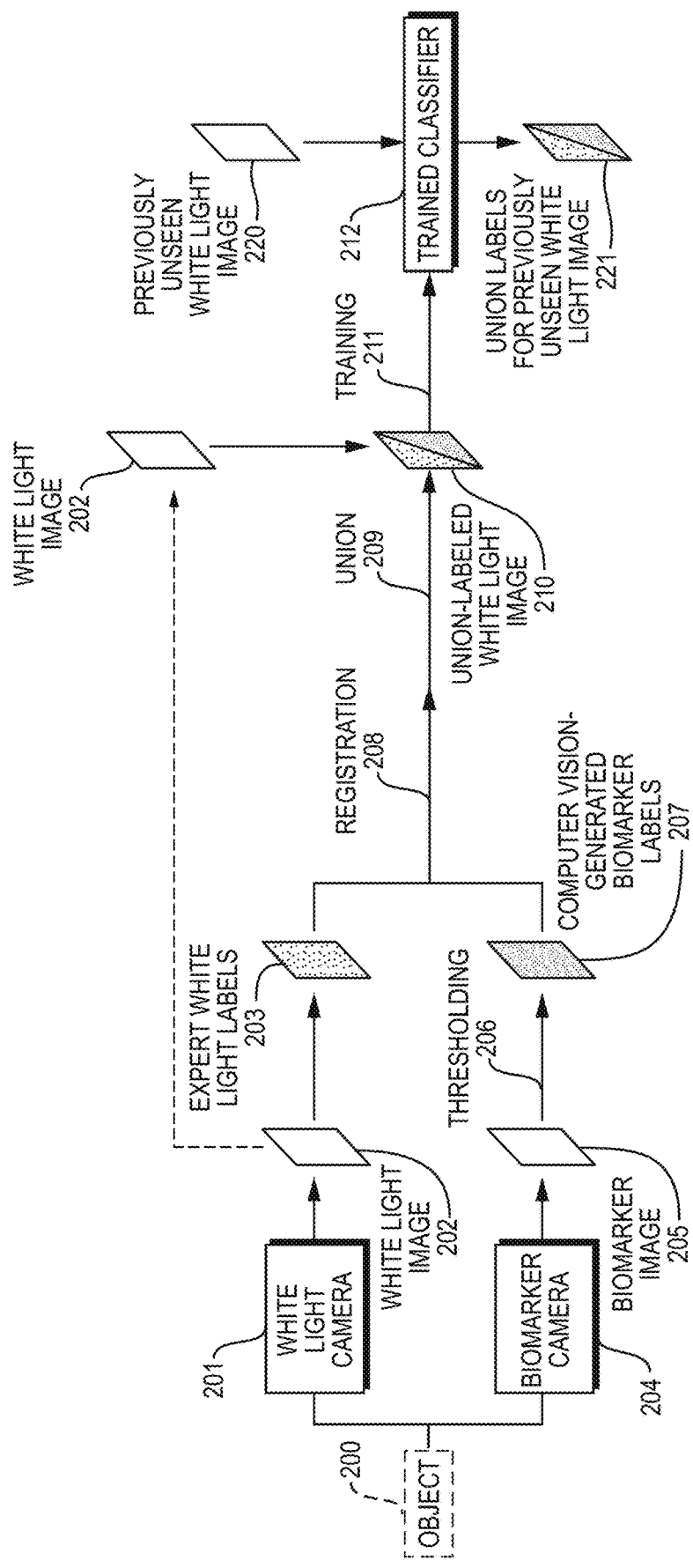
FIG. 2 shows a flowchart for a method that employs union-labeled white light images to train a classifier, in such a way that the trained classifier may accurately classify a previously unseen white light image.

FIG. 2 shows a flowchart for a method that employs union-labeled white light images to train a classifier, in such a way that the trained classifier may accurately classify a previously unseen white light image.

Figure 3:
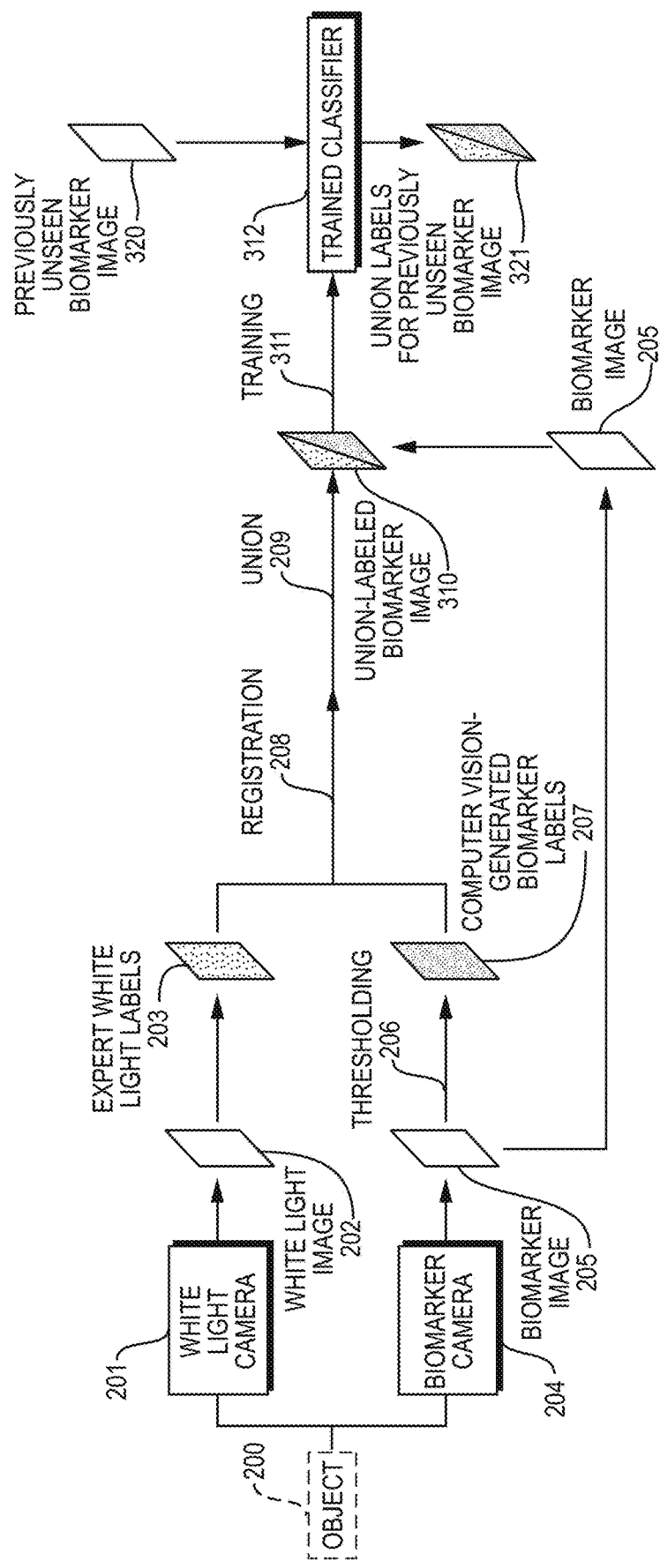
FIG. 3 shows a flowchart for a method that employs union-labeled biomarker images to train a classifier, in such a way that the trained classifier may accurately classify a previously unseen biomarker image.

FIG. 3 shows a flowchart for a method that employs union-labeled biomarker images to train a classifier, in such a way that the trained classifier may accurately classify a previously unseen biomarker image.

In FIGS. 2 and 3, a white light camera 201 captures a white light image 202 of object 200. The white light image 202 is formed by white light in the visible spectrum. A human expert creates labels 203 for the white light image, on a pixel-by-pixel basis. Each expert label indicates either that "X is present" or "X is not present" at the pixel to which the label is applied. In FIGS. 2 and 3, a biomarker camera 204 captures a biomarker image 205 of object 200. The biomarker image 205 is captured by a different imaging modality than that employed to capture white light image 202. Thresholding 206 is performed to detect pixels that have a parameter (e.g., incident light intensity) that exceeds (or alternatively, is less than) a specified threshold. A computer vision algorithm creates labels 207 for the biomarker image, on a pixel-by-pixel. Each computer vision label indicates either that "X is present" or "X is not present" at the pixel to which the label is applied.

In FIGS. 2 and 3, registration 208 is performed to register the white light image 202 and biomarker image 205. A computer calculates the union 209 of the expert labels and the computer vision-generated labels on a pixel-by-pixel basis, so that there is a union label for each pixel.

In the example shown in FIG. 2, the union labels are applied to white light image 202. The resulting union-labeled white light image 210 is a training image.

In FIG. 2, a set of training images is created by repeating the above process (described in the preceding three paragraphs) for multiple objects. For instance, if object 200 comprises a tooth, then many different teeth may be imaged, and for each different tooth, the process described (described in the preceding three paragraphs) may be performed to create a training image.

In FIG. 2, training 211 is performed to train a classifier on a set of training images, where each training image is union-labeled white light image. The trained classifier 212 then classifies a previously unseen white light image 220 by predicting union labels 221 for the previously unseen white light image.

In the example shown in FIG. 3, the union labels are applied to biomarker image 205. The resulting union-labeled biomarker image 310 is a training image.

In FIG. 3, a set of training images is created by repeating the above process (described above with respect to 201-209 and 310 in FIGS. 2 and 3) for multiple objects. For instance, if object 200 comprises a tooth, then many different teeth may be imaged, and for each different tooth, this process (described above with respect to 201-209 and 310 in FIGS. 2 and 3) may be performed to create a training image.

In FIG. 3, training 311 is performed to train a classifier on a set of training images, where each training image is union-labeled biomarker image. The trained classifier 312 then classifies a previously unseen biomarker image 320 by predicting union labels 321 for the previously unseen biomarker image.

In some cases, in FIGS. 2 and 3: (a) object 200 comprises teeth; (a) biomarker image 205 is formed by at least red fluorescent light that is emitted by porphyrins on the surface of the teeth and that is filtered to remove blue and violet light; (b) biomarker camera 204 is a camera that is configured to emit 405 nm light (which excites the fluorescence), to filter out blue and violet light and to capture red light and other light in the visible spectrum; (c) thus, biomarker camera 204 captures red fluorescent light which is emitted by porphyrins and is a signature for dental plaque on the teeth; and (d) a computer vision algorithm detects pixels in the biomarker image that correspond to the presence of dental plaque, by histogram thresholding to determine a set of pixels that have a measured intensity of incident light (in a specific color range) above a specified threshold, and labeling those pixels as "plaque present" and labeling all other pixels "plaque not present".

In some cases, in FIG. 2, the trained classifier 212 classifies a previously unseen white light image 220 of teeth, by predicting, on a pixel-by-pixel basis, union labels 221 for that previously unseen white light image 220.

In some cases, in FIG. 3, the trained classifier 312 classifies a previously unseen biomarker image 320 of teeth, by predicting, on a pixel-by-pixel basis, union labels 321 for that previously unseen biomarker image 220

In some cases, in FIGS. 2 and 3, each label (out of labels 221 and 321) specifies whether, at the pixel to which the label applies, dental plaque is or is not present. In some cases, in FIGS. 2 and 3, each label (out of labels 221 and 321) that is applied to a pixel specifies a probability that plaque is present at that pixel. In some cases, in FIGS. 2 and 3, each label (out of labels 221 and 321) that is applied to a pixel specifies a degree to which plaque is present at that pixel (or specifies a relative amount of plaque that is present at that pixel).

Alternatively, in some cases, in FIGS. 2 and 3, each label (out of labels 221 and 321) specifies whether, at the pixel to which the label applies, gingivitis is or is not present. In some cases, in FIGS. 2 and 3, each label (out of labels 221 and 321) that is applied to a pixel specifies a probability that gingivitis is present at that pixel. In some cases, in FIGS. 2 and 3, each label (out of labels 221 and 321) that is applied to a pixel specifies a degree to which gingivitis is present at that pixel (or specifies a relative amount of gingivitis that is present at that pixel).

In some cases, in FIGS. 2 and 3, labels are applied to biomarker images 202 by human experts, instead of by computer vision. For instance, the human expert may label biomarker images by putting boxes around biomarkers in the biomarker images. For example, in some cases: (a) biomarker images 202 are fluorescent images; (b) fluorescent regions are visible in these images; and (c) a human expert puts boxes around the fluorescent regions. In these cases, the phrase "computer-vision generated biomarker labels" for 207 may be replaced by the phrase "expert biomarker labels."

Figure 4:
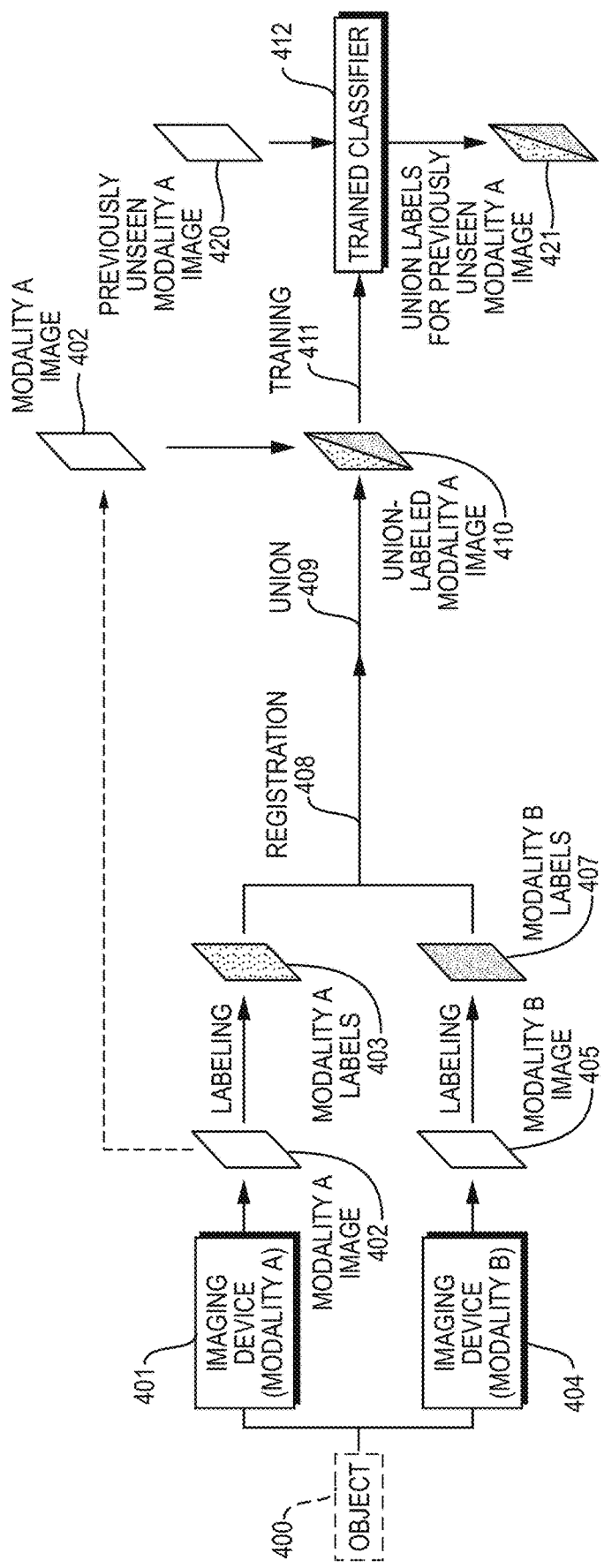
FIG. 4 shows a flowchart for a method that employs union-labeled "modality A" images to train a classifier, in such a way that the trained classifier may accurately classify a previously unseen "modality A" image.

FIG. 4 shows a flowchart for a method that employs union-labeled "modality A" images to train a classifier, in such a way that the trained classifier may accurately classify previously unseen "modality A" images.

In some cases, in FIG. 4, the "modality A" imaging system differs, in a structural aspect or in a functional aspect, from the "modality B" imaging system. Thus, in some cases, in FIG. 4, the modality B image 405 is captured by a different imaging modality than that employed to capture modality A image 402.

In the example shown in FIG. 4, a modality A camera 401 captures a modality A image 402 of object 400. Labels 403 may be applied to the modality A image, on a pixel-by-pixel basis. In FIG. 4, a modality B camera 404 captures a modality B image 405 of object 400. Labels 407 may be applied to the modality B image, on a pixel-by-pixel. Each label (out of labels 403 and 407) may classify a pixel as either "X" or "not X".

In some cases, labels 403 are created by a human expert and labels 407 are generated by a computer vision algorithm. In some cases, labels 403 are generated by a computer vision algorithm and labels 407 are created by a human expert. In some cases, labels 403 and 407 are all created by one or more human experts. In some cases, labels 403 and 407 are all generated by a computer vision algorithm.

In FIG. 4, registration 408 is performed to register the modality A image 402 and modality B image 405. A computer may calculate the union 409 of the expert labels and the union labels on a pixel-by-pixel basis, so that there is a union label for each pixel. The union labels may be applied to modality A image 402. The resulting union-labeled modality A image 410 may comprise a training image.

A set of training images may be created by repeating the process (described in the preceding three paragraphs) for multiple objects. For instance, if object 400 comprises a tissue structure, then many different examples of that tissue structure may be imaged, and for each, the process (described in the preceding three paragraphs) may be performed to create a training image.

Training 411 may be performed to train a classifier on a set of training images, where each training image is union-labeled modality A image. Then, the trained classifier 412 may classify a previously unseen modality A image 420 by predicting union labels 421 for the previously unseen modality A image.

In FIG. 4, imaging modality A may comprise an imaging technology with a specific contrast agent and imaging modality B may comprise the same imaging technology without a contrast agent. Or imaging modality A may comprise an imaging technology with a first contrast agent and imaging modality B may comprise the same imaging technology with a second contrast agent. Or imaging modality A may comprise an imaging technology with a specific tissue stain or dye; and imaging modality B may comprise the same imaging technology without a tissue stain or dye. Or imaging modality A may comprise an imaging technology with a first tissue stain or dye; and imaging modality B may comprise the same imaging technology with a second tissue stain or dye. Or imaging modality A may comprise an imaging technology with a first radionuclide and imaging modality B may comprise the same imaging technology with a second radionuclide. Or imaging modality A may comprise an imaging technology with a first radiotracer and imaging modality B may comprise the same imaging technology with a second radiotracer. Or imaging modality A may comprise an imaging technology with a first radioligand and imaging modality B may comprise the same imaging technology with a second radioligand.

In FIG. 4, in some cases, imaging modalities A and B may comprise two different imaging technologies which employ different hardware (e.g., MRI and CT). For instance, in some cases, imaging modality A and imaging modality B may capture: (a) white light images and x-ray images, respectively; (b) white light images and PET images, respectively; (c) white light images and MRI images, respectively; (d) MRI images and CT images, respectively; or (e) white light images and CT images, respectively.

For instance, each of the following is a different imaging modality, for purposes hereof: (1) MRI (magnetic resonance imaging) without a contrast agent; (2) MRI with gadoterate contrast agent; (3) MRI with gadodiamide contrast agent; (4) MRI with gadobenate contrast agent; (5) MRI with gadopentetate contrast agent; (6) MRI with gadoteridol contrast agent; (7) MRI with gadoversetamide contrast agent; (8) MRI with gadoxetate contrast agent; (9) MRI with gadobutrol contrast agent; (10) MRI with gadofosveset contrast agent; (11) MRI with gadocoletic acid contrast agent; (12) MRI with gadomelitol contrast agent; (13) MRI with superparamagnetic iron oxide contrast agent; (14) MRI with manganese chelate contrast agent; (15) MRI with β-galatosidase-activated contrast agent; (16) PET (positron emission tomography) with a radiotracer comprising FDG (fluorodeoxyglucose) labeled with flourine-18; (17) PET with oxygen-15 water radiotracer; (18) PET with nitrogen-13 ammonia radiotracer; (19) PET with rubidium-82 chloride radiotracer; (20) PET with carbon-11 acetate radiotracer; (21) SPECT (single-photon emission computed tomography) with technetium-99m radioisotope; (22) SPECT with an iodine radioisotope; (23) SPECT with indium-111 radioisotope; (24) CT (x-ray computed tomography) without contrast agent; (25) CT with iohexol contrast agent; (26) CT with iopromide contrast agent; (27) CT with iothalamate contrast agent; (28) CT with ioxaglate contrast agent; (29) CT with iodixanol contrast agent; (30) CT with iopamidol contrast agent; (31) CT with iosimenthol contrast agent; (32) CT with GE-145 contrast agent; (33) ultrasound without contrast agent; (34) ultrasound with bubble contrast agent comprising an albumin shell with an octafluoropropane gas core; (35) ultrasound with bubble contrast agent comprising a lipid/galactose shell with an air core; (36) ultrasound with a bubble contrast agent comprising a lipid shell with an octafluoropropane gas core; (37) ultrasound with any other bubble contrast agent comprising a different combination of (i) chemical composition of bubble shell and (ii) chemical composition of gas core; (38) white light image of tissue (e.g., tissue biopsy) without any stain; (39) white light image of tissue stained by hematoxylin and eosin (H&E) stain; (40)

white light image of tissue stained by Toluidine blue stain; (41) white light image of tissue stained by Masson's trichrome stain; (42) white light image of tissue stained by Mallory's trichrome stain; (43) white light image of tissue stained by Weigert's elastic stain; (44) white light image of tissue stained by Heidenhain's AZAN trichrome stain; (45) white light image of tissue stained by Silver stain; (46) white light image of tissue stained by Wright's stain; (47) white light image of tissue stained by Orcein stain; (48) white light image of tissue stained by Periodic acid-Schiff stain (PAS) stain; (49) x-ray projection radiograph; and (50) fluorescent image. For each pair of these fifty different imaging modalities, a first image (captured by one of the imaging modalities in the pair) and a second image (captured by the second imaging modality in the pair) comprise a modality A image and a modality B image, respectively, as those terms are used herein. This paragraph and the preceding two paragraphs are not an exhaustive list of imaging modalities that may be employed. This paragraph and the preceding two paragraphs are not an exhaustive list of modality A images and modality B images. This paragraph and the preceding two paragraphs list non-limiting examples. Other imaging modalities may be employed in this invention.

In some cases, in FIGS. 2, 3 and 4, trained classifier 212, 312, 412 comprises a neural network, such as a convolutional neural network (CNN). As noted above, in FIGS. 2, 3 and 4, labels are applied on a pixel-by-pixel basis. Alternatively, FIGS. 2, 3 and 4, labels may be applied on a patch-by-patch basis, where each patch is a group of multiple pixels.

In some implementations of this invention, a CNN performs patch-based image analysis, in which each patch of pixels (e.g., a patch of 21×21 pixels) is analyzed in order to classify a pixel at the center of the patch. This may be done in such a way that a different patch is analyzed for each pixel being labeled. Alternatively, instead of a patch-based approach, the image analysis may employ a pixel-based approach for example using an FCN, or a region-based approach for example using an R-CNN.

In some implementations, an output of the neural network (that was trained on images labeled with union labels) is a label that classifies an entire image. Alternatively, in some implementations, an output of the neural network (that was trained on images labeled with union labels) comprises: (a) a set of labels, each of which labels a different region of an image, or (b) a label that labels a set of images.

In some implementations, a single human expert or a group of human experts annotates images, to create the human-annotated images that are taken as an input when calculating union labels. Alternatively, in some cases, the human annotations are provided by non-experts through crowdsourcing.

In illustrative implementations of this invention, a wide variety of color models may be employed in images that are classified. Among other things, the RGB (Red Green Blue) color model or the HSI (Hue Saturation Intensity) color model may be employed. In some case, a camera captures RGB data, and this data is transformed into HSI data. In some implementations, the same color model is used for all of the classifiers (e.g., RGB may be employed in images classified by initial machine classifier, images annotated by a human expert, training images that are labeled with union labels, and in a previously unknown image that is being classified by a trained CNN).

In some implementations, a set of images that are labeled comprise images of teeth, dental plaque, dental fluorosis, other dental or oral diseases or conditions, images of biopsy tissue samples, or images of organs, tissue, or diseases, or other medical images.

In some cases, at least one of the sets of images (e.g., a set of images initially classified by computer vision or initially annotated by a human expert) comprises images of fluorescent porphyrin biomarkers, or other fluorescent biomarkers such as pyridoxal, siderophore (e.g., pyoverdin) or other fluorophores.

In some implementations of this invention, at least one of the sets of images (e.g., a set of images initially classified by machine or initially annotated by a human) comprises images of light in the visible spectrum. In some implementations, a wide variety of technology may be employed to capture light in the visible spectrum. For example, in some implementations of this invention, images of visible light may be captured by a digital single-lens reflex camera, point-and-shoot camera, webcam, camera housed in a smartphone, digital camera, digital video camera, plenoptic camera, fluorescent biomarker imaging camera, CCD (charge-coupled device) camera, CMOS (complementary metal-oxide-semiconductor) camera, NMOS (N-type metal-oxide-semiconductor) camera, Live MOS camera, flat panel detector, or other camera.

This invention is not limited to classifying images of light captured in the visible spectrum. For example, in some cases, at least one set of images (e.g., a set of images initially classified by machine or initially annotated by a human) may comprise any type of imaging data acquired at any wavelength of light, such as data measured by near-infrared imaging, x-ray, CT (x-ray computed tomography), cone-beam CT, infrared imaging, terahertz imaging (such as terahertz time-domain spectroscopy), gigahertz imaging, time-of-flight imaging, radar, LIDAR, MRI (magnetic resonance imaging), or multi-spectral imaging.

In some alternative implementations of this invention: (a) there is only one imaging modality and only one imaging device; (b) each image, in a set of images captured by the imaging device, is labeled by a human expert and is also labeled by a computer vision algorithm; (c) union labels are generated, where the union label for each specific pixel is the union of the expert label and the computer-vision generated label; (d) steps (b) and (c) of this sentence are repeated to create a set of union-labeled training images; (e) a classifier is trained with this set of union-labeled training images; and (f) after being trained, the trained classifier may classify a previously unseen image captured by the imaging device, in order to produce union labels for the previously unseen image.

Classification

Figure 5:
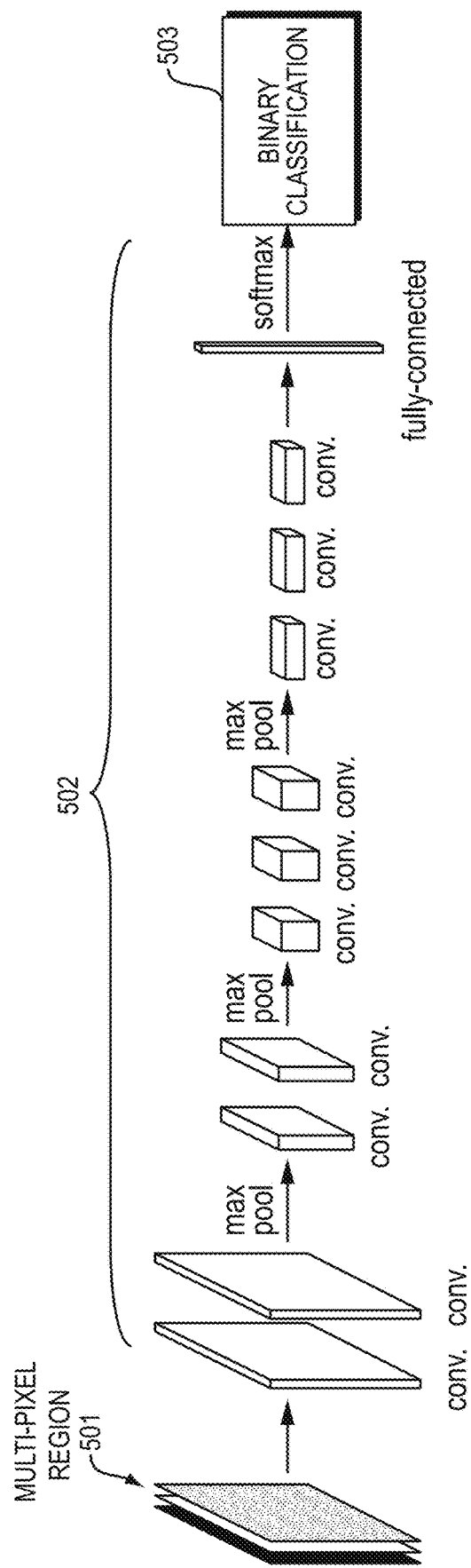
FIG. 5 shows a flowchart for a method that employs a classifier (which has been trained with union-labeled images) to perform binary classification.

FIG. 5 shows a flowchart for a method that employs a classifier (which has been trained with union-labeled images) to classify with a binary classification.

Figure 6:
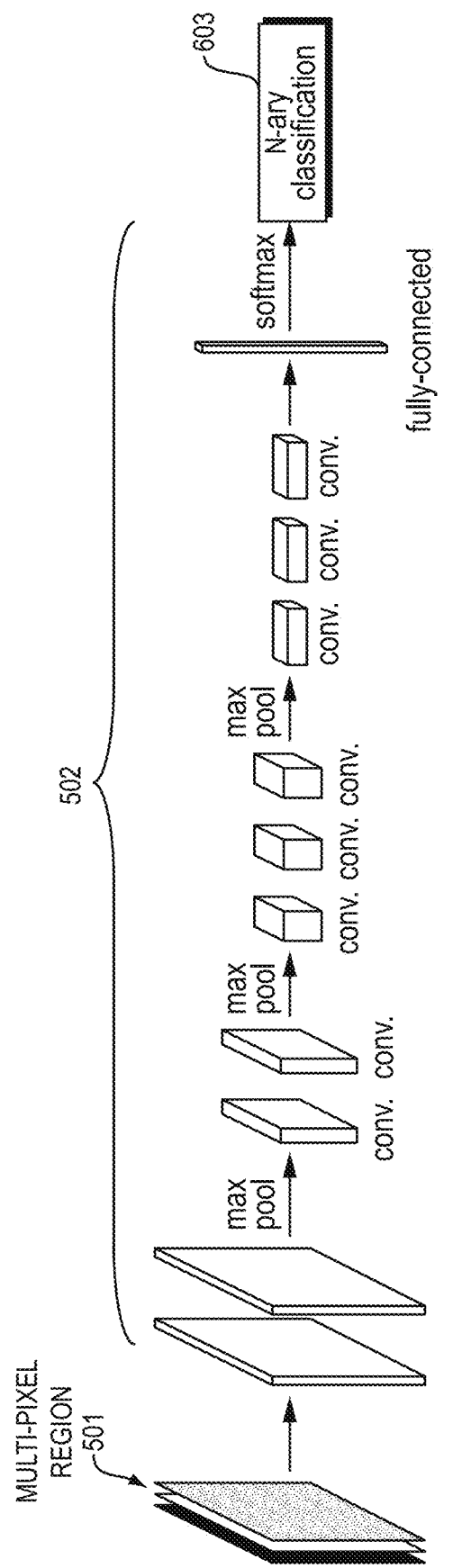
FIG. 6 shows a flowchart for a method that employs a classifier (which has been trained with union-labeled images) to classify in more than two classes.

FIG. 6 shows a flowchart for a method that employs a classifier (which has been trained with union-labeled images) to classify in more than two classes.

Figure 7:
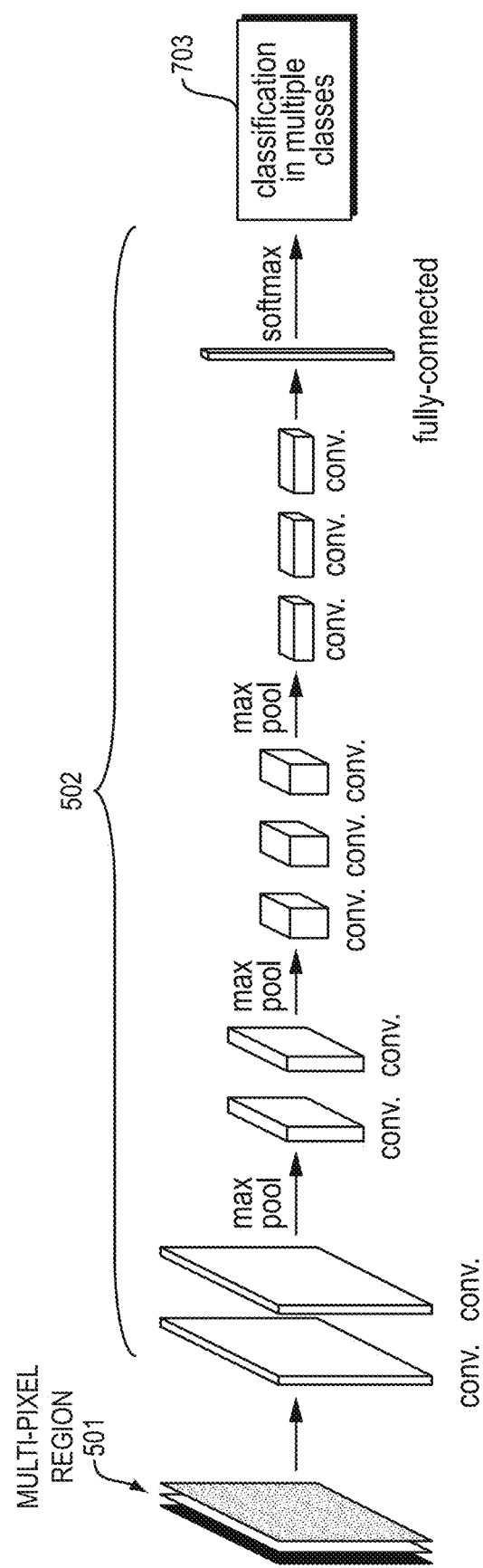
FIG. 7 shows a flowchart for a method that employs a classifier (which has been trained with union-labeled images) to classify an object as being simultaneously in multiple classes.

FIG. 7 shows a flowchart for a method that employs a classifier (which has been trained with union-labeled images) to classify an object as being simultaneously in multiple classes.

In FIGS. 5, 6, and 7, a multi-pixel region 501 is an input to a neural network 502. In some cases, multi-pixel region 501 is a patch of pixels, such as a patch of 21×21 pixels. Alternatively, multi-pixel region 501 may be an entire image. In some cases, neural network 502 is a convolutional neural network. For instance, neural network 502 may comprise the first 13 layers of a VGG16 convolutional network followed by a fully-connected layer and soft max function (a "modified VGG16"). Each of the convolution layers in this modified VGG16 architecture may have a ReLU (rectified linear unit) activation function. The layers of this modified VGG16 are depicted in FIGS. 5, 6 and 7. Alternatively, neural network 502 may have an architecture that is different than a modified VGG16.

In the example shown in FIG. 5, neural network 502 (which has been trained with union-labeled images) outputs a binary classification. For instance, in FIG. 5, neural network 502: (a) may take, as an input, a patch of pixels in an image (such as a patch of 21×21 pixels); and (b) may output a binary classification of a pixel in the center of the patch. For example, in FIG. 5, neural network 502: (a) may classify the central pixel as "X" or "not X", but not both at the same time, where "X" and "not X" are the only two classes permitted in the classification; or (b) may calculate the probability that the central pixel is "X", where the only permitted classes are "X" and "not X". Or, in FIG. 5, neural network 502 may determine the central pixel's degree of membership in two classes ("X" and "not X"), where "X" and "not X" are the only two classes that the patch is permitted to be a member of (at least to some degree).

In the example shown in FIG. 6, neural network 502 (which has been trained with union-labeled images) outputs an "N-ary" classification—that is, a classification in which there are N permitted classes, where N≥3. For instance, in FIG. 6, neural network 502: (a) may take, as an input, a patch of pixels in an image (such as patch of 21×21 pixels); and (b) may output an N-ary classification of a pixel in the center of the patch. For example, in FIG. 6, neural network 502: (a) may classify the central pixel as "X", "Y" or "Z" ", but only one at a time, where "X", "Y" and "Z" are the only classes permitted in the classification; or (b) may calculate the probability that the central pixel is "X", the probability that the central pixel is "Y", and the probability that the central pixel is "Z", where the only three permitted classes are "X", "Y" and "Z". Or, in FIG. 6, neural network 502 may determine the central pixel's degree of membership in three classes "X", "Y" and "Z", where "X", "Y" and "Z" are the only three classes that the patch is permitted to be a member of (at least to some degree).

In FIG. 6, union labels for each permitted class (out of the three or more permitted classes) may be computed separately. For instance, in FIG. 6, if the only three permitted classes are "X", "Y" and "Z", then: (a) the union labels for "X" may be computed separately; (b) the union labels for "Y" may be computed separately; and (c) (a) the union labels for "Z" may be computed separately.

In the example shown in FIG. 7, neural network 502 (which has been trained with union-labeled images) classifies an object as being simultaneously in multiple classes. For instance, in FIG. 7, neural network 502: (a) may take, as an input, a patch of pixels in an image (such as a patch of 21×21 pixels); and (b) may classify the pixel in the center of the patch as being simultaneously in multiple classes. For example, in FIG. 7, if the central pixel may simultaneously be a member of one or more of "X", "Y" and "Z", and if "X", "Y" and "Z" are the only permitted classes (other than combinations of permitted classes), then neural network 502: (a) may classify the central pixel as being "X", being "Y", being "Z", being "X and Y", being "Y and Z", being "X and Z", or being "X, Y and Z"; or (b) may calculate the probability that the central pixel is "X", the probability that the central pixel is "Y", the probability that the central pixel is "Z", the probability that the central pixel is "X and Y", the probability that the central pixel is "Y and Z", the probability that the central pixel is "X and Z", and the probability that the central pixel is "X, Y and Z".

In FIG. 7, union labels for each permitted class (or group of classes) may be computed separately. For instance, in FIG. 7, if an object may simultaneously be a member of one or more of "X", "Y" and "Z", then: (a) the union labels for class "X" may be computed separately; (b) the union labels for class "Y" may be computed separately; (c) the union labels for class "Z" may be computed separately; (d) the union labels for class "X and Y" may be computed separately; (e) the union labels for class "Y and Z" may be computed separately; (f) the union labels for class "X and Z" may be computed separately; and (b) the union labels for class "X, Y and Z" may be computed separately.

As noted above, in some implementations of this invention, the labels indicate degree of membership in a fuzzy set. For instance, a pixel's degree of membership in a fuzzy set called "dental plaque" may indicate the relative amount of plaque that is present at that pixel. For example, 1.0 may indicate heavy plaque, 0.5 may indicate medium plaque and 0.0 may indicate no plaque.

In some implementations (where the expert labels and the initial computer vision-generated labels denote degree of membership in a fuzzy set), a fuzzy union label may be calculated in different ways. For purposes of this paragraph, let $a \in [0,1]$ be the degree of membership of x in a fuzzy set A; let $b \in [0,1]$ be the degree of membership of x in a fuzzy set B; and let U(a, b) be the fuzzy union of a and b. For instance, x may be a pixel in an image, or a patch of pixels in an image. In some implementations of this invention (in which fuzzy logic is employed), each fuzzy union label may be computed: (i) with a Lukasiewicz fuzzy union operator U(a, b)=min(1, a+b); or (ii) with a probabilistic fuzzy union operator U(a, b)=a+b−(ab); or (iii) with a Zadeh fuzzy union operator U(a, b)=max(a, b); or (iv) with a Yager fuzzy union operator U(a, b)=min[(1, $a^w$+$b^w$)$^{1/w}$], where $w \in (0, \infty)$; or (v) with a Hamacher's sum fuzzy union operator $$U(a, b) = \frac{a + b - (2 - \gamma)ab}{1 - (1 - \gamma)ab},$$

where γ≥0; or (vi) with a bounded fuzzy union operator U(a, b)=min(1, $\sqrt{a^2+b^2}$); or (vii) with a drastic sum fuzzy union operator, where U(a, b) equals a if b=0, b if a=0, and 1 for others.

Different fuzzy union operators may be desirable, depending on the data being classified. For instance:

As noted above, the Lukasiewicz fuzzy union operator is the lesser of (i) 1 and (ii) the sum of a and b (recall that the highest possible degree of membership is 1). Thus, the Lukasiewicz fuzzy union operator may (in some cases) be desirable where: (a) there is a very little overlap between fuzzy sets A and B; (b) membership in fuzzy set A is an independent indication of a condition sought to be diagnosed; and (c) membership in fuzzy set B is also an independent indication of the condition sought to be diagnosed.

As can be seen from the description above, the probabilistic fuzzy union operator is similar to a conventional union operator. Thus, the probabilistic fuzzy union operator, too, may (in some cases) be desirable where: (a) there is a very little overlap between fuzzy sets A and B; (b) membership in fuzzy set A is an independent indication of a condition sought to be diagnosed; and (c) membership in fuzzy set B is also an independent indication of the condition sought to be diagnosed.

As noted above, the drastic sum fuzzy union operator is 1 if either a or b is non-zero. Thus, the drastic sum fuzzy union operator may (in some cases) be desirable where: (a) even a slight degree of membership in fuzzy set A indicates that a condition sought to be diagnosed is fully present; and (b) even a slight degree of membership in fuzzy set B indicates that the condition sought to be diagnosed is fully present.

In each implementation that involves a "union", the union may instead be a fuzzy union. In each implementation that involves a union operator, the union operator may instead be a fuzzy union operator.

In illustrative implementations of this invention, a CNN (convolutional neural network) may be trained on a set of images labeled with union labels. For example, the CNN that is trained (on a set of images labeled with union labels) may comprise a LeNet, AlexNet, VGG-16 (Visual Geometry Group 16-layer neural network), VGG-19 (Visual Geometry Group 19-layer neural network), ResNet, GoogleNet (e.g., Inception 3), multi-stream CNN, multi-stream multi-channel CNN, FCN (fully convolutional network), or U-Net FCN. The CNN, once trained, may be used to classify a previously unknown image of the same type as the training images. For example, if the training images comprise white-light images where each pixel, respectively, is labeled with a union label, then the CNN, once trained, may classify a previously unknown white-light image.

In some implementations, employing an FCN may provide a significant decrease in both training and testing time at the expense of requiring more training data.

Alternatively, in illustrative implementations, any other method of supervised machine learning may be employed when training on images labeled with union labels. For example, a RNN (recurrent neural network), RNN with LSTM (long short term memory), RNN with Gated Recurrent Unit, MLP (multi-layered perceptron), ANN (artificial neural network), or SVM (support vector machine) may be trained on images labeled with union labels. Again, once the algorithm is trained, it may be used to classify a previously unknown image of the same type as the training images. Again, for example, if the training images comprise white-light images where each pixel, respectively, is labeled with a union label, then the algorithm, once trained, may classify a previously unknown white-light image.

Depending on the particular type of data being classified in a particular implementation of this invention, the type of machine learning employed may vary. A method of machine learning well-suited for the type of data being analyzed may be employed to classify the data.

As noted above, in some implementations, the union labels are generated based on a first set of images that have been classified by a computer vision algorithm and a second set of images that have been annotated by a human expert. For instance, the first set of images may comprise biomarker images that are classified by a computer vision algorithm applying labels (e.g. computer vision generated labels 207) to the biomarker images.

As used in the following three paragraphs: (a) "initial machine classifier" means a classifier used to assign computer-generated labels that are taken as an input when calculating the union labels; and (b) "union-label-trained classifier" means a classifier that is trained on images labeled with union labels.

In many cases, the initial machine classifier is a simpler classifier than the union-label-trained classifier. For example, the machine classifier may comprise a histogram thresholding operation that assigns machine labels to pixels with values in specific color ranges when the input images encode relevant information as specific colors, as some biomarker images do.

In some cases, both the initial machine classifier and union-label-trained classifier are the same type of neural network. For example, in some cases, both the initial machine classifier and the union-label-trained classifier comprise a VGG16 neural network. Also, for example, in some cases both the initial machine classifier and union-label-trained classifier comprise a FCN (fully convolutional network).

The initial machine classifier may be different than the union-label-trained classifier (including differences in type, architecture or hyperparameters). For example, in some cases, the initial machine classifier comprises a neural network that is of a different type than (or that has a different architecture than, or that has different hyperparameters than) the union-label-trained classifier. For example, in some cases, the initial machine classifier is a VGG16 network and the union-label-trained classifier is an FCN.

In some cases, the initial machine classifier performs unsupervised machine learning. For example, in some cases, the initial machine classifier comprises AEs (auto-encoders), deep AEs, SAEs (stacked auto-encoders), VAE (variational auto-encoder), GAN (generative adversarial network), or RBMs (Restricted Boltzman Machines), or comprises a DBN (Deep Belief Network), or performs PCA (principal component analysis) or clustering.

Imaging Hardware

Figure 8:
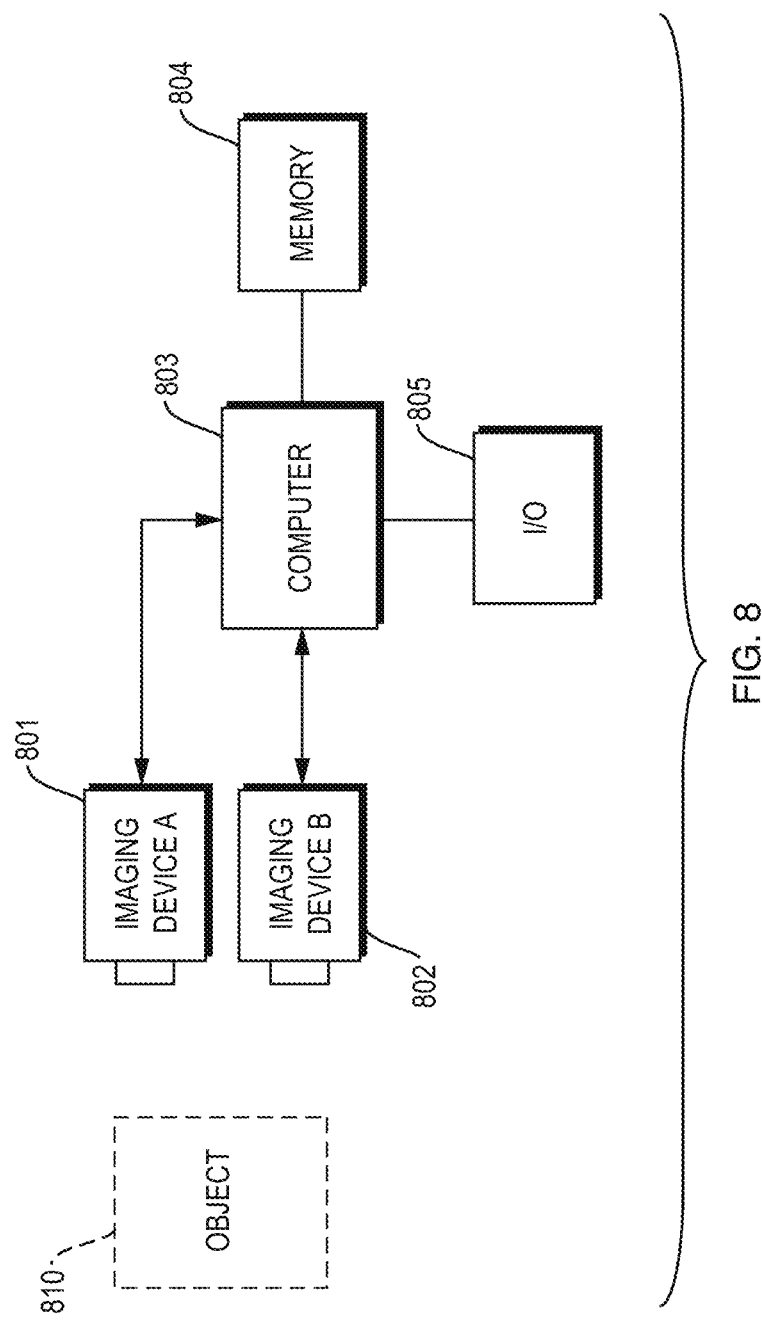
FIG. 8 shows hardware of an imaging system that is configured to acquire and classify an image.

FIG. 8 shows hardware of an imaging system that is configured to acquire and classify an image. In the example shown in FIG. 8: (a) imaging device A 801 captures modality A images of object 810; and (b) imaging device B 802 captures modality B images of object 810. For instance, imaging device A 801 and imaging device B 802 may comprise white light camera 201 and biomarker camera 204, respectively (as shown in FIGS. 2 and 3). Or, for example, imaging device A 801 and imaging device B 802 may comprise an MRI imaging device and a PET imaging device, respectively. Or, for instance, imaging device A 801 and imaging device B 802 may comprise an CT imaging device and a PET imaging device, respectively.

In FIG. 8, a human expert may interact with one or more I/O (input/output) devices 805 to apply expert labels to an image on a pixel-by-pixel or patch-by-patch basis. For instance, the human expert may employ one or more I/O devices 805 to label each pixel of a white light image of teeth as either "plaque present" or "plaque not present". The one or more I/O devices 805 may comprise one or more electronic display screens, computer monitor screens, touch screens, projectors, projector screens, keyboards, computer mice, microphones, speakers, electronic styluses, or haptic transducers. The one or more I/O devices 805 may present a graphical user interface (GUI) whereby: (a) a human user may input instructions or information or (b) information or instructions may be displayed to (or otherwise outputted to) a human user. For instance, a human expert may employ a "digital brush" in a GUI to apply labels to pixels (e.g., to label pixels as either "plaque present" or "plaque not present").

In FIG. 8, computer 803 may perform a computer vision algorithm to initially classify an image on a pixel-by-pixel basis or on an patch-by-patch basis. Computer 803 may perform registration and thresholding, may compute union labels, may apply union labels to an image to create a union-labeled training image, may train a classifier on union-labeled training images, and may, after the classifier is trained, classify previously unseen images. Computer 803 may cause data to be stored in, and to be accessed from, memory device 804.

Prototype

The following 21 paragraphs describe a prototype of this invention.

In this prototype, plaque's presence on part of a tooth is detected based on information contained in the immediate neighborhood. Hence, the CNN architecture takes as input an n×n white light image patch and outputs a prediction of whether the patch's center pixel corresponds to plaque or not. This local patch-based method is desirable for classifying plaque because plaque's free-form shape makes bounding boxes a poor model of plaque presence; thus, a per-pixel annotation is advantageous. Training on patches rather than full images additionally allows for much more training data from fewer images.

In this prototype, because a CNN is trained on the union labels, the CNN learns more comprehensive signatures of plaque, encompassing both biomarker locations and expert annotations which do not have significant overlap.

In this prototype, the CNN architecture is a truncated version of VGG16. The truncated version is used in order to achieve a small model with a great enough capacity to learn the training distribution. The inventors experimentally determined a depth that did not result in underfitting on the training set, which is the first thirteen layers of the VGG16 architecture, followed by a smaller fully-connected layer of 256 nodes and the final softmax function.

In this prototype, the convolutional neural network architecture takes as input an n×n pixel patch from a standard photograph and outputs a probability of whether the patch's center pixel corresponds to the condition or not. In this prototype, the network architecture comprises the first through thirteenth layers of VGG16 followed by a smaller fully-connected layer of 256 nodes and a final softmax function. In this prototype, the CNN was trained using adaptive stochastic gradient descent with momentum, and the loss function captures the softmax cross-entropy in classification of all patches in the current mini-batch. In this prototype, gradients are calculated by backpropagation. To help prevent overfitting to the training data, the training is performed with a dropout probability of 0.5.

In this prototype, a fully-trained convolutional neural network processes all 21×21 patches of a previously unseen photograph and produces a classification for each pixel corresponding to the predicted presence or absence of the clinical condition. The information from specialized medical images and expert annotations is incorporated during the training process; the trained convolutional neural network may classify a standard white-light photograph.

In this prototype, there is a trade-off between patch size and the amount of different images required; larger patches contain more contextual information around the center pixel but can therefore each capture less of the variation than a smaller patch would, thereby requiring more training patches. That is, the space of variation is larger for larger patches. After initial optimization experiments, a patch size of 21×21 pixels was chosen. Two classifiers are implemented using TensorFlow™ software, and training is performed on an NVIDIA Corporation GM200 GeForce GTX TITAN X. Training hyperparameters were determined through grid search: mini-batch size of 100, learning rate of $1\times10^{-6}$, 3 epochs.

In this prototype, two different versions of the imaging system were tested.

In this prototype, the first version of the imaging system comprises an Acetone® Soprocare® intraoral probe ("CD probe") that operates in (among other things): (a) a white light mode and (b) a "plaque" mode. In white light mode, the CD probe illuminates teeth with white light and captures white light images. In the plaque mode, the CD probe illuminates teeth with both 450 nm and white light, and then digitally embellishes the color of newly-formed plaque-affected areas in hues of yellow and orange.

In this prototype, the second version of the imaging system comprises an intraoral probe (the "RD probe") that operates in two different modes. In the first mode, the RD probe emits white light and captures white light images. In the second mode, the RD probe illuminates plaque with 405 nm light and captures red fluorescent light that (a) is emitted by porphyrin associated with mature plaque biofilms formed by anaerobic bacteria and (b) is filtered to remove blue and violet light.

In this prototype, two classifiers successfully predict the location of dental plaque in white light dental images with high accuracy. In this prototype, there are two fully trained and validated CNNs. Each of these CNNS (after learning from both fluorescent biomarker images as well as expert labels), accepts standard white light intraoral images as inputs and predicts the location of plaque pixels with high sensitivity and specificity.

In a test of this prototype, 27 adult subjects consented to imaging of incisors and canines. Each subject was imaged sequentially in (1) white light mode, (2) CD plaque mode, (3) RD white light mode, and (4) RD plaque mode. In total, 47 pairs of images were captured with the CD, and 49 pairs were captured with the RD. Illumination conditions were kept as constant as possible across subjects in each dataset. Each pair of images: (a) comprised a white light image captured by the CD probe and a fluorescent biomarker image captured by the CD probe; or (b) comprised a white light image captured by the RD probe and a fluorescent biomarker image captured by the RD probe In this test of the prototype, datasets from the CD probe and RD probe comprise white light images and corresponding fluorescent biomarker images. The white light and biomarker images were registered with each other. To perform the registration, a perspective transformation that minimizes the mean-squared error between the intensities of the images was applied to the biomarker images.

In this test of the prototype, a computer computed a binary pixel-level classification of plaque and not-plaque of the biomarker image. This pixel-by-pixel classification was by histogram thresholding the fluorescent biomarker images using empirically-determined thresholds for each dataset. The devices did not capture all plaque in an image due to the absence of porphyrins in some plaque.

In this test of the prototype, expert dental professionals independently annotated regions showing plaque on the white light images of teeth captured by the CD probe and the RD probe.

In this test of the prototype, union labels were calculated. In this test o the prototype, the union labels represent the full extent of plaque detected by human experts, by computer vision labeling of fluorescent biomarker images, or by both. In this test of the prototype, if either or both indicate that plaque is present, the union label indicates that plaque is present. This is desirable approach because the fluorescent biomarker images do not show all plaque (because porphyrins are not present in some plaque) and because the human experts do not detect all plaque in white light images. In this test of the prototype, only a small percentage of the per-pixel plaque labels in each union label image were detected by both the expert and device, indicating distinct roles for each labeling method.

In this test of the prototype, two CNN were trained. One CNN was trained on pairs of images captured by the CD probe. The other CNN was trained on pairs of images captured by the RD probe.

In this test of the prototype, these pixel-level annotations contained in the union are the labels used to train and test the CNN classifiers.

In this test of the prototype, the pixel dimensions of the RD images were 512×384 while those of the CD images were 640×480. Accounting for the margins, each type of image were represented by 183,393 or 290,625 patches, respectively, where each patch consisted of 21×21 pixels. A random sample of half the patches in each training image were used for training to limit overfitting on extremely similar patches, while all patches in test images were used for testing. Patches from a single image were not split among the train and test sets.

In this test of the prototype, each image was assigned to one of three groups based on the amount of plaque in the union label: low plaque, medium plaque, high plaque. Then 70% of images from each group were randomly assigned to the training set and the remaining 30% to the test set to ensure that the plaque quantity distribution of the training and test sets were roughly the same. For the CD dataset, 4,687,980 patches from 33 images were used for training and 3,977,694 patches from 14 images were used for testing. For the RD dataset, 3,209,360 patches from 35 images were used for training and 2,750,895 patches from 14 images were used for testing. Images were normalized in the RGB colorspace, and white light images in the RD dataset all received the same color balancing to account for variation in illumination. Each feature in the training set was standardized to have a zero mean and unit variance, and the transformations with the same parameters were applied to each feature in the test set.

In this test of this prototype, training accuracy and test accuracy were 87.93% and 84.67%, respectively, for the RD dataset.

In this test of this prototype, training accuracy and test accuracy were 80.83% and 87.18%, respectively, for the CD dataset.

The prototype described in the preceding 21 paragraphs is a non-limiting example of this invention. This invention may be implemented in many other ways.

Sensors

This invention is not limited to classifying images.

In some implementations, a classifier (which has been trained on union labels) classifies measurements taken by sensors. As a non-limiting example: (a) a first set of sensor measurements may be taken by a thermometer and a second set of sensor measurements may be taken by a voltmeter; and (b) the first and second sets of sensor measurements may be employed to create union labels.

In some implementations: (a) a classifier (which has been trained on union labels) classifies sensor data taken by more than two types of sensors; and (b) more than two types of sensors take measurements that are used to create the union labels. For instance, two, three, four, five, six or more types of sensors may be employed.

In some implementations, at least one set of data (e.g., a set of sensor data initially classified by machine or initially annotated by a human) comprises sensor data regarding physiologic phenomenon, such as sensor data regarding heart rate, respiration rate, blood pressure, blood chemistry, EDA (electro-dermal activity), or such as EEG (electroencephalography) data, other electrophysiological data, or ultrasound data. Also, for example, in some implementations, at least one set of data (e.g., a set of sensor data initially classified by machine or initially annotated by a human) comprises weather data or seismographic data. Also, for example, in some implementations, at least one set of data (e.g., a set of sensor data initially classified by machine or initially annotated by a human) comprises sensor data regarding pressure, temperature, contact, proximity, movement, acceleration, sound, vibration, electromagnetic radiation, electrical phenomenon (e.g., resistance, capacitance, inductance, impedance, current), or magnetic phenomenon, gravity, weight, or material property. Also, for example, in some implementations, at least one set of data (e.g., a set of sensor data initially classified by machine or initially annotated by a human) comprises sensor data regarding a phenomenon that varies as a function of spatial position, or that varies as a function of time, or that varies as a function of any one or more physical parameters or other parameters.

In some implementations of this invention: (a) X different types of sensors are employed, where $X \geq 2$; (b) registration is performed in such a way that, after registration, the sensor measurements taken by the X types of sensors comprise groups of registered measurements where all of the measurements in each particular group are registered with each other and are measurements of the same physical object or same physical event; (c) each group of registered measurements includes X measurements, one by each type of sensor; and (d) for each specific datapoint in a group of registered measurements, the union label is the union of the initial labels for that specific datapoint. For instance, in some cases, if a group of registered measurements includes measurements taken by only three types of sensors and the initial labels for a specific datapoint are "1" for the first type of sensor, "0" for the second type of sensor, and "0" for the third type of sensor, then the union label for that specific datapoint is "1". Likewise, in some cases, if a group of registered measurements includes measurements taken by only three types of sensors and the initial labels for a specific datapoint are "0" for the first type of sensor, "0" for the second type of sensor, and "0" for the third type of sensor, then the union label for that specific datapoint is "0". In some cases: (a) sensor measurements taken by at least one of the X types of sensor are initially labeled by a human expert; and (b) sensor measurements taken by at least one other of the X types of sensors are initially labeled by a computer algorithm (e.g., a supervised or unsupervised machine learning algorithm).

Figure 9:
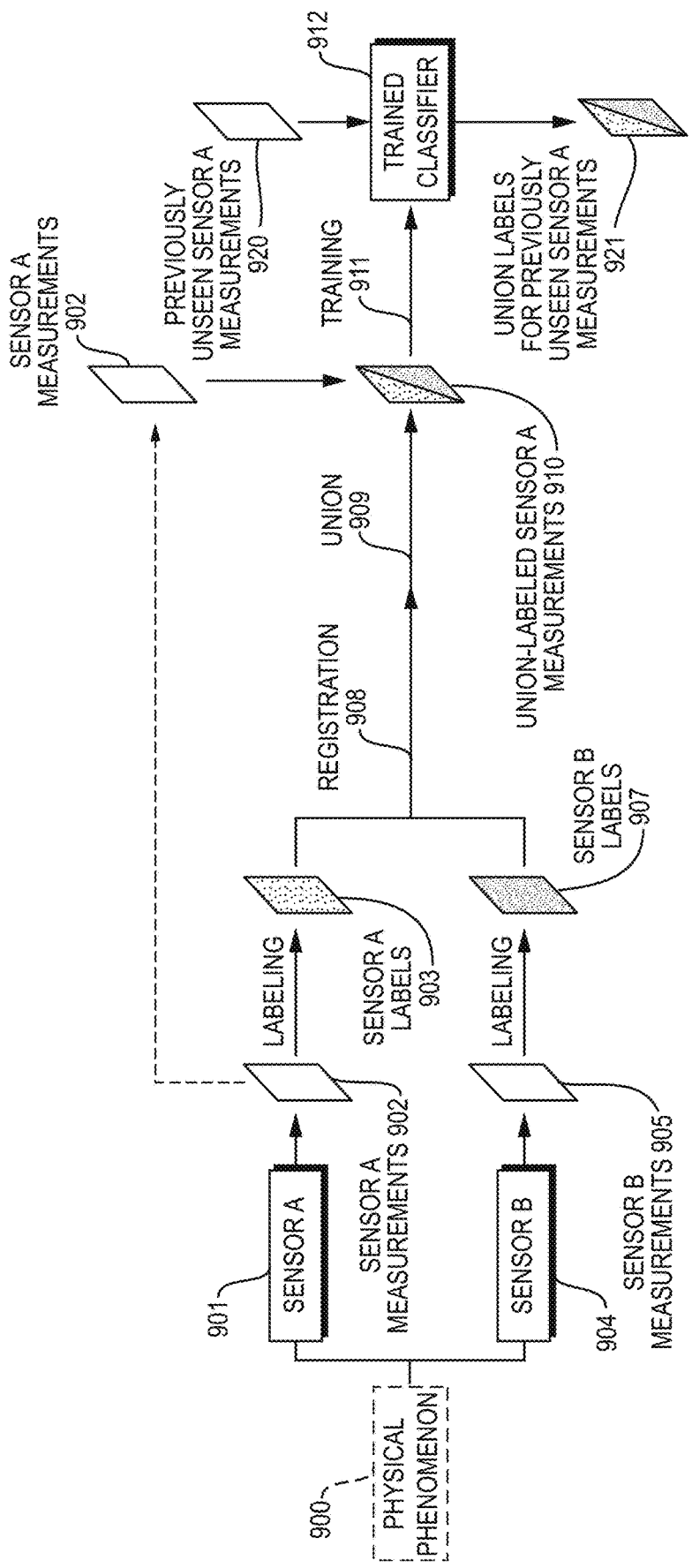
FIG. 9 shows a flowchart for a method that employs union-labeled sensor data to train a classifier, in such a way that the trained classifier may accurately classify previously unseen sensor data.

FIG. 9 shows a flowchart for a method that employs union-labeled sensor data to train a classifier, in such a way that the trained classifier may accurately classify previously unseen sensor data.

In the example shown in FIG. 9, sensor A 901 differs, in structure and function, from sensor B 904. Sensor A 901 takes measurements 902 of phenomenon 900. Labels 903 are applied to the sensor A measurements, on a measurement-by-measurement basis. In FIG. 9, sensor B 904 takes measurements 905 of phenomenon 900. Labels 907 may be applied to the sensor A measurements, on a measurement-by-measurement basis. Each label (out of labels 903 and 907) may classify a measurement as either "X" or "not X".

In some cases, labels 903 are created by a human expert and labels 907 are generated by a computer algorithm. In some cases, labels 903 are generated by a computer algorithm and labels 907 are created by a human expert. In some cases, labels 903 and 907 are all created by one or more human experts. In some cases, labels 903 and 907 are all generated by a computer algorithm.

In FIG. 9, registration 908 is performed to register the sensor A measurements 902 and sensor B measurements 905. A computer calculates the union 909 of the expert labels and the union labels on a measurement-by-measurement basis, so that there is a union label for each measurement. The union labels are applied to the sensor A measurements 902 to create union-labeled sensor A measurements 910.

This process may be repeated for multiple phenomena, to acquire a training dataset that comprises union-labeled measurements. Training 911 may be performed to train a classifier on a set of training data, where each measurement in the training data is a union-labeled sensor A measurement. Then, the trained classifier 912 may classify previously unseen sensor A measurements 920 by predicting union labels 921 for the previously unseen sensor A measurements, on a measurement-by-measurement basis.

In some implementations, a classifier (which has been trained on union labels) classifies regions of sensor readings. For instance, each region being classified may comprise a single datapoint (single measurement by a sensor). Alternatively, each region being classified may comprise a group of measurements (e.g., that are captured during a specific time period or that are captured for a specific spatial region).

Figure 10:
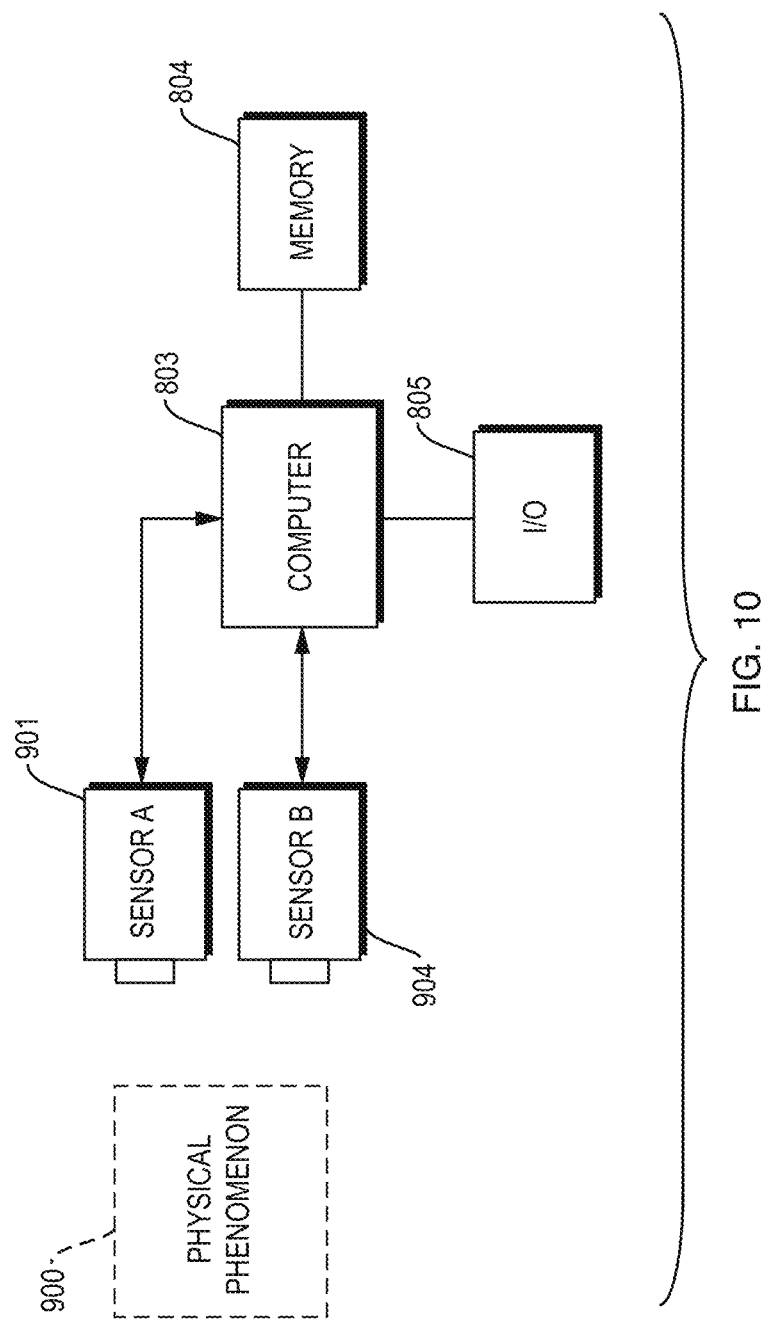
FIG. 10 shows hardware of a sensor system that is configured to acquire and classify sensor data.

FIG. 10 shows hardware of a sensor system that is configured to acquire and classify sensor data. In the example shown in FIG. 10, a human expert may interact with one or more I/O (input/output) devices 805 to apply expert labels to sensor measurements on a measurement-by-measurement basis or region-by-region basis (where each region is a group of measurements).

In FIG. 10, computer 803 may perform a computer algorithm to initially classify sensor measurements on a measurement-by-measurement or region-by-region basis (where each region is a group of measurements). Computer 803 may perform registration and thresholding, may compute union labels, may apply union labels to a sensor measurement to create a union-labeled measurement, may train a classifier on union-labeled measurements, and may, after the classifier is trained, classify previously unseen sensor measurements.

Data Sets

This invention is not limited to classifying data captured by sensors.

In some implementations, a classifier (which has been trained on union labels) classifies any type of data. For example, in some cases, the data being labeled may comprise economic data, financial data (such as data regarding stock prices or prices of other financial assets), or data regarding education, music, politics or other human activity.

In some implementations of this invention: (a) X different types of data are employed, where X≥2; (b) registration is performed to register the X types of data; and (c) for each specific datapoint, the union label is the union of the initial labels for that datapoint. For instance, in some cases, if the registered data includes only three types of data and the initial labels for a specific datapoint are "1" for the first type of data, "0" for the second type of data, and "0" for the third type of data, then the union label for that specific datapoint is "1". Likewise, in some cases, if the registered data includes only three types of data and the initial labels for a specific datapoint are "0" for the first type of data, "0" for the second type of data, and "0" for the third type of data, then the union label for that specific datapoint is "0". In some cases: (a) at least one of the X types of data is initially labeled by a human expert; and (b) at least one other of the X types of data is initially labeled by a computer algorithm (e.g., a supervised or unsupervised machine learning algorithm).

Figure 11:
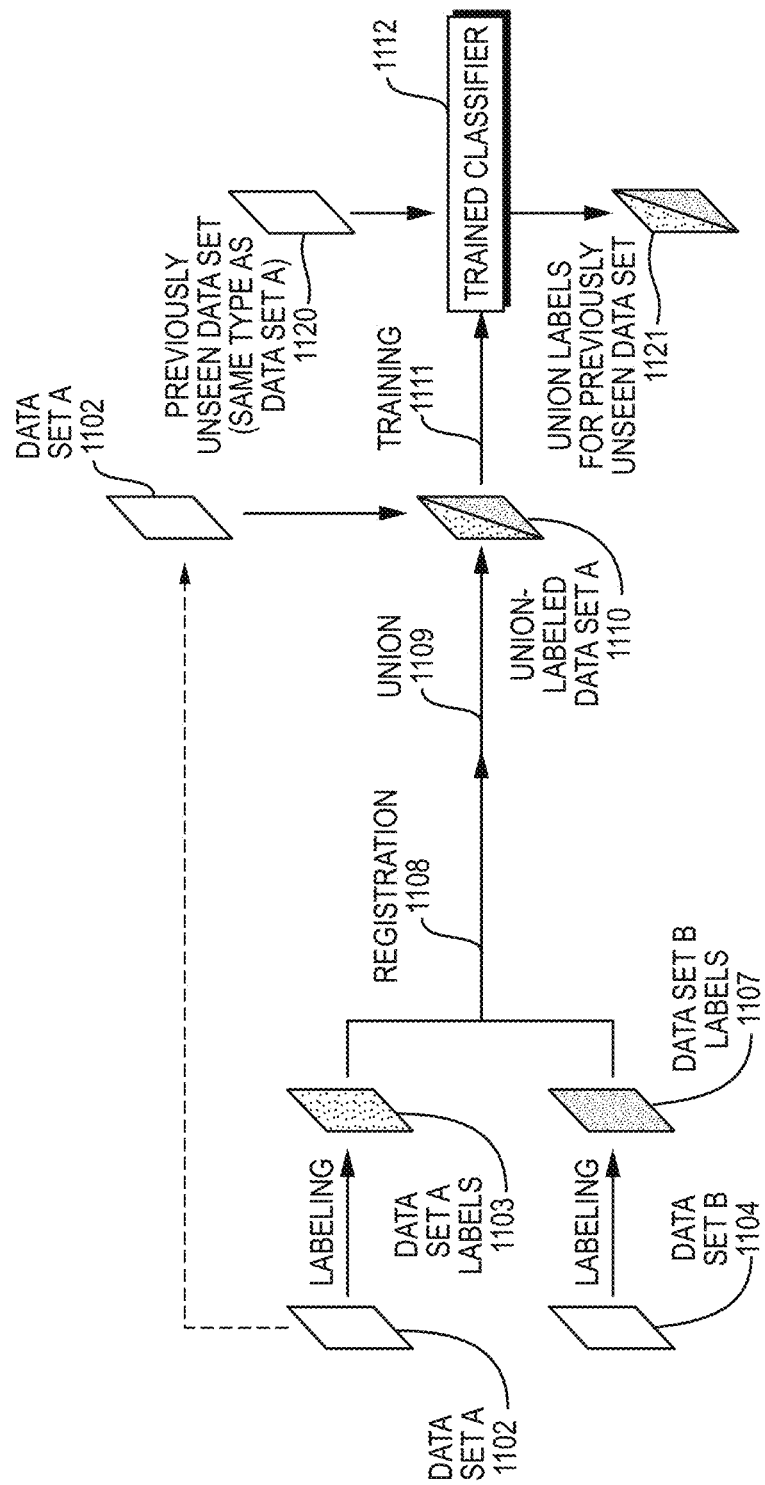
FIG. 11 shows a flowchart for a method that employs union-labeled data to train a classifier, in such a way that the trained classifier may accurately classify previously unseen data.

FIG. 11 shows a flowchart for a method that employs union-labeled data to train a classifier, in such a way that the trained classifier may accurately classify previously unseen data.

In the example shown in FIG. 11, dataset A 1102 is a different type of data than dataset B 1104. For instance: (a) dataset A 1102 may comprise transcripts of broadcasters' words during broadcast soccer games and may be initially labeled by a human expert; and (b) dataset B 1104 may comprise audio recordings of sounds made by audience in the stadium during the same soccer games and may be initially labeled by sound recognition software. Labels 1103 may be applied to dataset A 1102. Labels 1107 may be applied to dataset B 1104. Each label (out of labels 1103 and 1107) may classify a datapoint as either "X" or "not X".

In some cases, labels 1103 are created by a human expert and labels 1107 are generated by a computer algorithm. In some cases, labels 1103 are generated by a computer algorithm and labels 1107 are created by a human expert. In some cases, labels 1103 and 1107 are all created by one or more human experts. In some cases, labels 1103 and 1107 are all generated by a computer algorithm.

In FIG. 9, registration 1108 is performed to register dataset sensor A 1102 and dataset B 1105. A computer may calculate the union 1109 of the expert labels and the union labels on a datapoint-by-datapoint basis, so that there is a union label for each datapoint. The union labels may be applied to dataset A 1102 to create a union-labeled dataset A 1110.

This process may be repeated, to acquire a training dataset. Training 1111 may be performed to train on this training dataset. Then, the trained classifier 1112 may classify a previously unseen dataset 1120 (of the same type as dataset A) by predicting union labels 1121 for the previously unseen dataset.

Registration

Registration of Images: As noted above, images may be registered before computing union labels. In some cases, registration is performed by comparing intensity patterns by correlation metrics. For instance, registration may be performed by a perspective transformation that minimizes the mean-squared error between the intensities of the images. In some cases, registration is performed by detecting corresponding features in images. For instance, the corresponding features may be points (e.g., such as CCPs (corresponding control points)), lines or contours. Registration may involve performing rotation, scaling, shearing or other affine transformations of an image being registered. In some cases, registration involves warping of local regions of an image being registered. The registration methods described above in this paragraph may also be applied to registering sensor data or other data, with appropriate modification if needed. For instance, in some cases, if sensor data (or other data) is being registered and if that sensor data (or other data) does not have units of intensity, then registration may be performed by comparing patterns of magnitude (or size, amount or amplitude) of a phenomenon represented by the sensor data (or by other data).

Registration of Sensor Data: In some implementations, sensor measurements: (a) are taken by different types of sensors; (b) are each a function of the same independent variable; and (c) may be registered by causing sensor measurements for the same value of that independent variable to be paired with each other, grouped with each other, or otherwise aligned with each other. As a non-limiting example of registration, consider two sets of sensor measurements f(t) and g(t), where sensor measurements f(t) are taken by a first type of sensor, where sensor measurements g(t) are taken by a different type of sensor, and where sensor measurements f(t) and g(t) both vary as a function of the same independent variable t. For instance, t may be time. In this example, to say that sensor measurements f(t) and g(t) are "registered" with each other means that, for each specific value $t_s$ in a set of values of t, sensor measurements $f(t_s)$ and $g(t_s)$ are paired with each other, grouped with each other, or otherwise aligned with each other. As another non-limiting example of registration, consider two sets of sensor measurements f(x, y) and g(x, y), where sensor measurements f(x, y) are taken by a first type of sensor, where sensor measurements g(x, y) are taken by a different type of sensor, and where sensor measurements f(x, y) and g(x, y) both vary as a function of the same independent variables x and y. For instance, x and y may be Euclidean spatial coordinates. In this example, to say that sensor measurements f(x, y) and g(x, y) are "registered" with each other means that, for each specific point $(x_s, y_s)$ in a set of (x, y) points, sensor measurements $f(x_s, y_s)$ and $g(x_s, y_s)$ are paired with each other, grouped with each other, or otherwise aligned with each other.

Registration of data: In some implementations, different types of data: (a) are each a function of the same independent variable; and (b) may be registered by causing datapoints for the same value of that independent variable to be paired with each other, grouped with each other, or otherwise aligned with each other. As a non-limiting example of registration, consider two datasets f(t) and g(t), where dataset f(t) and dataset g(t) both vary as a function of the same independent variable t. In this example, to say that dataset f(t) and dataset g(t) are "registered" with each other means that, for each specific value $t_s$ in a set of values of t, datapoint $f(t_s)$ and datapoint $g(t_s)$ are paired with each other, grouped with each other, or otherwise aligned with each other. As another non-limiting example of registration, consider two datasets f(x, y) and g(x, y), where dataset f(x, y) and dataset g(x, y) both vary as a function of the same independent variables x and y. In this example, to say that dataset f(x, y) and dataset g(x, y) are "registered" with each other means that, for each specific point $(x_s, y_s)$ in a set of (x, y) points, datapoint $f(x_s, y_s)$ and datapoint $g(x_s, y_s)$ are paired with each other, grouped with each other, or otherwise aligned with each other.

Single Modality

In some implementations of this invention, only one imaging modality (or only one sensing modality) is employed.

For instance, in some cases, two sets of images are captured by the same camera. The first set of images may be initially labeled by a human expert, on a pixel-by-pixel basis. The second set of images may be initially labeled by computer vision, on a pixel-by-pixel basis. The first and second sets of images may be registered. Union labels may be calculated. For each pixel of the registered images, the union label may be the union of the expert label and computer vision label for that pixel. This process may be repeated, to create a training set of union-labeled images. A classifier may be trained on this training set. Once trained, the classifier may classify a previously unseen image (which was captured by the same camera) by predicting union labels for that image.

Likewise, in some cases, two sets of measurements are taken by the same sensor. The first set of measurements may be initially labeled by a human expert. The second set of measurements may be initially labeled by a computer algorithm. The first and second sets of measurements may be registered. Union labels may be calculated. For each measurement, the union label may be the union of the expert label and computer vision label for that measurement. This process may be repeated, to create a training set of union-labeled measurements. A classifier may be trained on this training set. Once trained, the classifier may classify a previously unseen measurement (which was captured by the same sensor) by predicting union labels for that measurement.

Projecting Labels

This invention is not limited to union labels.

In some implementations, instead of calculating union labels, labels from a first image (which was captured by a first imaging modality) are projected onto a second, unlabeled image (which was captured by a second imaging modality) to create a projection-labeled image. This projection-labeled image may comprise a training image. The process described in the preceding sentence may be repeated to create a set of training images, where each training image comprises a projection-labeled image (which was initially captured by the second imaging modality and then labeled with projected labels). For instance, each training image in the set of training images may be an image of a different sample (e.g., a different sample of the same type of tissue). A classifier may then be trained these projection-labeled images. Once trained, the classifier may classify a previously unseen image (which was captured by the second imaging modality) by predicting projection labels for that image. In these alternative implementations, the first and second images may be registered. Then, after this registration, labels from the first image may be projected onto a second, unlabeled image by, for each particular pixel in the first image, applying the label for the particular pixel to a corresponding pixel in the second image. The resulting labels on the second (previously unlabeled) image may comprise projection labels. Alternatively, the projection of labels may be on a patch-by-patch basis, instead of a pixel-by-pixel basis.

Each description herein of a method that employs union labels may instead be implemented with projection labels, by making appropriate modifications.

For example, in FIG. 2: (a) the expert white light labels 203 may be omitted, (b) the arrows from 202 to 203 and from 203 to 208 may be replaced by an arrow from 202 to 208 (which may join with the arrow from 207 to 208); (c) the word "union" in 209 may be replaced by the phrase "projecting labels"; (d) the phrase "union-labeled" in 210 may be replaced by the phrase "projection-labeled"; and (e) the phrase "union labels" in 221 may be replaced by the phrase "predicted projection labels".

Likewise, in FIG. 3: (a) the expert white light labels 203 may be omitted, (b) the arrows from 202 to 203 and from 203 to 208 may be replaced by an arrow from 202 to 208 (which may join with the arrow from 207 to 208); (c) the word "union" in 209 may be replaced by the phrase "projecting labels"; (d) the phrase "union-labeled" in 310 may be replaced by the phrase "projection-labeled"; and (e) the phrase "union labels" in 321 may be replaced by the phrase "predicted projection labels".

Likewise, in FIG. 4: (a) the modality A labels 403 may be omitted, (b) the arrows from 402 to 403 and from 403 to 408 may be replaced by an arrow from 402 to 408 (which may join with the arrow from 407 to 408); (c) the word "union" in 409 may be replaced by the phrase "projecting labels"; (d) the phrase "union-labeled" in 410 may be replaced by the phrase "projection-labeled"; and (e) the phrase "union labels" in 421 may be replaced by the phrase "predicted projection labels".

Likewise, in FIG. 9: (a) the sensor A labels 903 may be omitted, (b) the arrows from 902 to 903 and from 903 to 908 may be replaced by an arrow from 902 to 908 (which may join with the arrow from 907 to 908); (c) the word "union" in 909 may be replaced by the phrase "projecting labels"; (d) the phrase "union-labeled" in 910 may be replaced by the phrase "projection-labeled"; and (e) the phrase "union labels" in 921 may be replaced by the phrase "predicted projection labels".

Likewise, in FIG. 11: (a) the dataset A labels 1103 may be omitted, (b) the arrows from 1102 to 1103 and from 1103 to 1108 may be replaced by an arrow from 1102 to 1108 (which may join with the arrow from 1107 to 1108); (c) the word "union" in 1109 may be replaced by the phrase "projecting labels"; (d) the phrase "union-labeled" in 1110 may be replaced by the phrase "projection-labeled"; and (e) the phrase "union labels" in 1121 may be replaced by the phrase "predicted projection labels".

Non-Transitory Media

In some implementations, a non-transitory machine-accessible medium (e.g., a compact disk or thumb drive) has instructions encoded thereon for enabling one or more computers to perform one or more of the Computer Tasks (as defined herein).

Downloading Software

In some implementations, this invention comprises participating in a download of software, either as a computer providing the software or as a computer receiving the software, wherein the software comprises instructions for enabling one or more computers to perform one or more of the Computer Tasks.

Software

In the Computer Program Listing above, six computer program files are listed. These six computer program files comprise software employed in a prototype implementation of this invention. To run three of these (create_patches_random_train.txt, create_patches_test.txt and vgg_whitelight_cnn.txt) as Python™ software, the filename extension for each would be changed from ".txt" to ".py". To run the other three of these (interpretResults.txt, makeROC.txt and thresholdROCs.txt) as Matlab® software, the filename extension for each would be changed from ".txt" to ".m". In addition, before running these files, the filenames may be revised by replacing each underscore "_" in the filename with a dash "-" (e.g., change "create_patches_random_train.txt" to "create-patches-random-train.py".

Here is a description of these six computer program files:

(1) create_patches_random_train.txt extracts 21×21-pixel patches from training images, randomly sub/oversampling to get a desired class ratio;

(2) create_patches_test.txt extracts all 21×21-pixel patches from each image in the test set;

(3) interpretResults.txt constructs ROC (receiver operating characteristic) curve and precision-recall curves from .csv files (and converts from one-hot labels to indices);

(4) makeROC.txt generates ROC;

(5) thresholdROCs.txt averages ROC; and (6) vgg_whitelight_cnn.txt trains and tests a convolutional neural network for classifying the center pixel of an image patch from a white light dental image as plaque or not-plaque.

This invention is not limited to the software set forth in these six computer program files. Other software may be employed. Depending on the particular implementation, the software used in this invention may vary.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of an imaging system, including any light source, radiation source, light detector, radiation detector, or actuator (e.g., an electric motor for actuating a scan, such as a tomographic scan); (2) to perform a computer algorithm to initially label a set of data (e.g., to initially label an image on a pixel-by-pixel basis or a patch-by-patch basis, or to initially label sensor measurements, or to initially label other datapoints); (3) to control the operation of, and to receive data from, one or more input/output devices; (4) to control a graphical user interface whereby a human expert inputs labels (e.g., on a pixel-by-pixel basis or a patch-by-patch basis); (5) to calculate union labels; (6) to train a classifier (e.g., a neural network) with union-labeled data (e.g. to train with union-labeled images, or with union-labeled sensor data, or with other union-labeled data); (7) to employ a trained classifier, which has been trained with union-labeled data, to perform classification; (8) to project labels from a labeled image (or labeled sensor measurements or other labeled dataset) onto an unlabeled image (or unlabeled sensor measurements or other unlabeled dataset); (9) to train a classifier (e.g., a neural network) with projection-labeled data (e.g. to train with projection-labeled images, or with projection-labeled sensor data, or with other projection-labeled data); (10) to employ a trained classifier, which has been trained with projection-labeled data, to perform classification; (11) to analyze an image to detect dental plaque or gingivitis; (12) to receive data from, control, or interface with one or more sensors; (13) to perform any other calculation, computation, program, algorithm, or computer function described or implied herein; (14) to receive signals indicative of human input; (15) to output signals for controlling transducers for outputting information in human perceivable format; (16) to process data, to perform computations, and to execute any algorithm or software; and (17) to control the read or write of data to and from memory devices (tasks 1-17 of this sentence referred to herein as the "Computer Tasks"). The one or more computers (e.g. 803) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g., 801, 802, 803, 805, 901, 902) are configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 803) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To compute "based on" specified data means to perform a computation that takes the specified data as an input.

Non-limiting examples of a "camera" include: (a) a digital camera; (b) a digital grayscale camera; (c) a digital color camera; (d) a video camera; (e) a light sensor or image sensor, (f) a set or array of light sensors or image sensors; (g) an imaging system; (h) a light field camera or plenoptic camera; (i) a time-of-flight camera; and (j) a depth camera. In some cases, a camera includes any computers or circuits that process data captured by the camera.

The term "comprise" (and grammatical variations thereof) shall be construed as if followed by "without limitation". If A comprises B, then A includes B and may include other things.

Predicting labels is a non-limiting exampling of "classifying". Generating labels is a non-limiting example of "classifying".

Non-limiting examples of a "classifier" include: (a) a neural network; (b) a convolutional neural network; and (c) a machine learning model that performs classification.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Computed tomography" or "CT" means x-ray computed tomography.

A non-limiting example of "computer vision" is an algorithm that analyzes an image and applies labels to the image, on a pixel-by-pixel basis. Another non-limiting example of "computer vision" is an algorithm that analyzes an image and applies labels to the image, on a patch-by-patch basis. Another non-limiting example of "computer vision" is an algorithm that analyzes an image and applies a label to the entire image.

"Computer vision label" or "computer vision generated label" means a label produced by computer vision.

To say that a first image "corresponds" to a second image means that the first and second images are registered with each other. To say that a first pixel of a first image "corresponds" to a second pixel of a second image, which second image is registered with the first image, means that spatial position of the first pixel in the first image corresponds to spatial position of the second pixel in the second image. To say that a first patch of a first image "corresponds" to a second patch of a second image, which second image is registered with the first image, means that spatial position of the first patch in the first image corresponds to spatial position of the second patch in the second image.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

"Expert label" means a label inputted by a human expert.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"Fluorescent image" means an image that is formed by at least fluorescent light.

"Filtered fluorescent image" means an image that is formed by at least fluorescent light, which fluorescent light has been filtered.

"For instance" means for example.

"Fuzzy union label" means a label that is a fuzzy union of multiple other labels.

"Fuzzy union-labeled image" means an image to which one or more fuzzy union labels have been applied.

"Fuzzy union-labeled modality A image" means a modality A image to which one or more fuzzy union labels have been applied.

"Fuzzy union operator" means an operator that is an element of the set consisting of (i) the operator defined by $U(a, b)=\min(1, a+b)$; (ii) the operator defined by $U(a, b)=a+b-(ab)$; (iii) the operator defined by $U(a, b)=\max(a, b)$; (iv) the operator defined by $U(a, b)=\min[(1, a^w+b^w)^{1/w}]$, where $w \in (0, \infty)$; (v) the operator defined by $$U(a, b) = \frac{a + b - (2 - \gamma)ab}{1 - (1 - \gamma)ab},$$

where $\gamma \geq 0$; (vi) the operator defined by $U(a, b)=\min(1, \sqrt{a^2+b^2})$; and (vii) the operator defined by $U(a, b)$ equals a if $b=0$, b if $a=0$, and 1 for others. For purposes of the preceding sentence: (i) $a \in [0,1]$ is the degree of membership of x in a fuzzy set A; (ii) $b \in [0,1]$ is the degree of membership of x in a fuzzy set B; and (iii) $U(a, b)$ is the fuzzy union of a and b. For instance, in the preceding sentence, x may be a pixel in an image.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein, an image "of X" means an image of at least X.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Initial label" means a label that is not a union label.

The terms "modality A image" and "modality B image", when used together in the same sentence or sentence fragment, mean a first image and a second image, respectively, where either: (a) the first image differs from the second image in the type of contrast agent, dye, stain, radionuclide, or radioligand employed; or (b) the first image and second image are captured by a first imaging device and a second imaging device, respectively, the first imaging device being technologically different than the second imaging device.

The terms "modality A imaging device" and "modality B imaging device", when used together in the same sentence or sentence fragment, mean a first device and a second device, respectively, where the first device is configured to capture a modality A image and the second device is configured to capture a modality B image.

"N-ary classification" means a classification in which there are N permitted classes, where $N \geq 3$.

"MRI" means magnetic resonance imaging.

The term "or" is inclusive, not exclusive. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

Unless the context clearly indicates otherwise, "patch" means a patch of pixels.

"PET" means positron emission tomography.

"Pre-training image" means an image, the labels of which are used to help create union labels.

"Previously unseen" image, in the context of a classifier, means an image that: (a) is not a training image on which the classifier has trained; and (b) is not an image, labels of which have been used to help create union labels that were applied to a training image on which the classifier has trained.

As used herein, to "project" labels from a first image to a second image means, for each particular region in a set of regions in the first image, applying a label for the particular region to a corresponding region in the second image. For purposes of the preceding sentence, a "region" means a pixel or a patch of pixels.

The terms "sensor A" and "sensor B", when used together in the same sentence or sentence fragment, mean a first sensor and a second sensor, where the first sensor is technologically different than the second sensor.

As used herein, a non-limiting example of a "sentence fragment" is an entire patent claim.

As used herein, the term "set" does not include a group with no elements.

Unless the context clearly indicates otherwise, "some" means one or more.

As used herein, a "subset" of a set consists of less than all of the elements of the set.

The term "such as" means for example.

To say that a first imaging device is "technologically different" than a second imaging device means that the first imaging device differs, at least partially in structure and at least partially in function, from the second imaging device. To say that a first sensor is "technologically different" than a second sensor means that the first sensor differs, at least partially in structure and at least partially in function, from the second sensor.

To say that a machine-readable medium is "transitory" means that the medium is a transitory signal, such as an electromagnetic wave.

As used herein, a "union label" means the inclusive disjunction (or equivalently, Boolean OR) of multiple other labels. However, this definition of "union label" does not apply to a fuzzy union label.

"Union-labeled image" means an image to which one or more union labels have been applied.

"Union-labeled modality A image" means a modality A image to which one or more union labels have been applied.

"Visible spectrum" means the spectrum of frequencies that are less than 790 THz and greater than 430 THz.

"White light image" means an image formed by white light in the visible spectrum.

To say that a calculation is performed "with a classifier" means that the classifier performs the calculation.

Except to the extent that the context clearly requires otherwise, if steps in a method are described herein, then the method includes variations in which: (1) steps in the method occur in any order or sequence, including any order or sequence different than that described herein; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising (a) creating a set of union-labeled modality A images in such a way that each union-labeled image in the set is created by (i) capturing a modality A image, (ii) capturing a modality B image, (iii) accepting input, which input comprises expert labels for the modality A image, (iv) applying the expert labels to the modality A image on a pixel-by-pixel basis, (v) performing a computer vision algorithm that applies computer vision labels to the modality B image on a pixel-by-pixel basis, (vi) performing registration of the modality A image and modality B image, and (vii) after the registration, computing union labels for the modality A image in such a way that, for each specific pixel of the modality A image, a union label for the specific pixel is a union of (A) the expert label for the specific pixel and (B) the computer vision label for a corresponding pixel of the modality B image; (b) training a classifier on at least the set of union-labeled modality A images; and (c) after the training, calculating, with the classifier, union labels for a previously unseen modality A image, on a pixel-by-pixel basis. In some cases, each modality A image is a white light image and each modality B image is a fluorescent image In some cases, each modality A image and each modality B image is an image of all or a portion of one or more teeth. In some cases, each expert label, computer vision label and union label indicates either presence of, or absence of, dental plaque. In some cases, each expert label, computer vision label and union label indicates either presence of, or absence of, gingivitis. In some cases, each modality A image and each modality B image is a tomographic image. In some cases, each union-labeled image in the set captures a different physical object or different region of a physical object than that which is captured in each other union-labeled image in the set. Each of the cases described above in this paragraph is an example of the method described in the first sentence of this paragraph, and is also an example of an embodiment of this invention that may be combined with other embodiments of this invention.

In some implementations, this invention is a method comprising: (a) creating a set of union-labeled modality A images in such a way that each union-labeled image in the set is created by (i) capturing a modality A image, (ii) capturing a modality B image, (iii) applying initial labels to the modality A image on a pixel-by-pixel basis, (iv) applying initial labels to the modality B image on a pixel-by-pixel basis, (v) performing registration of the modality A image and modality B image, and (vi) after the registration, computing union labels for the modality A image in such a way that, for each specific pixel of the modality A image, a union label for the specific pixel is a union of (A) the initial label for the specific pixel and (B) the initial label for a corresponding pixel of the modality B image; (b) training a classifier on at least the set of union-labeled modality A images; and (c) after the training, calculating, with the classifier, union labels for a previously unseen modality A image, on a region-by-region basis. In some cases, each union-labeled image in the set captures a different physical object or different region of a physical object than that which is captured in each other union-labeled image in the set. In some cases, for each particular union-labeled modality A image in the set: (a) the particular union-labeled modality A image is an image of tissue before the tissue has been stained, and (b) a modality B image, which corresponds to the union-labeled modality A image, is an image of the tissue after the tissue has been stained. In some cases, for each particular union-labeled modality A image in the set: (a) the particular union-labeled modality A image is an image of tissue before the tissue has been stained by hematoxylin and eosin (H&E) stain, and (b) a modality B image, which corresponds to the union-labeled modality A image, is an image of the tissue after the tissue has been stained by H&E stain. In some cases, each modality A image and each modality B image is a tomographic image. In some cases: (a) each modality A image is a positron emission tomography image; and (b) each modality B image is a magnetic resonance imaging image. In some cases: (a) each modality A image is a positron emission tomography image; and (b) each modality B image is an x-ray computed tomography image. Each of the cases described above in this paragraph is an example of the method described in the first sentence of this paragraph, and is also an example of an embodiment of this invention that may be combined with other embodiments of this invention.

In some implementations, this invention is a system comprising: (a) a modality A imaging device; (b) a modality B imaging device; and (c) one or more computers; wherein (i) the one or more computers are programmed to acquire a set of union-labeled modality A images, in such a way that for each specific union-labeled image in the set, the one or more computers are programmed (A) to output an instruction for the modality A imaging device to capture a modality A image, (B) to output an instruction for the modality B imaging device to capture a modality B image, (C) to accept input, which input comprises expert labels for the modality A image, (D) to apply the expert labels to the modality A image on a pixel-by-pixel basis, (E) to perform a computer vision algorithm that applies the computer vision labels to the modality B image on a pixel-by-pixel basis, (F) to perform registration of the modality A image and modality B image, and (G) to compute, after the registration, union labels for the modality A image in such a way that, for each specific pixel of the modality A image, a union label for the specific pixel is a union of (I) the expert label for the specific pixel and (II) the computer vision label for a corresponding pixel of the modality B image, and (ii) the one or more computers are programmed (A) to train a classifier on the set of union-labeled modality A images; and (B) after the training, to calculate, with the classifier, union labels for a previously unseen modality A image, on a pixel-by-pixel basis. In some cases: (a) each modality A image is a white light image and each modality B image is a fluorescent image; and (b) each expert label, computer vision label and union label indicates either presence of, or absence of, dental plaque. In some cases, each union-labeled image in the set captures a different physical object or different region of a physical object than that which is captured in each other union-labeled image in the set. In some cases, for each particular union-labeled modality A image in the set: (a) the particular union-labeled modality A image is an image of tissue before the tissue has been stained, and (b) a modality B image, which corresponds to the union-labeled modality A image, is an image of the tissue after the tissue has been stained. In some cases, the modality A imaging device and the modality B imaging device are each a tomographic imaging device. In some cases: (a) the modality A imaging device is a positron emission tomography imaging device; and (b) the modality B imaging device is an x-ray computed tomography imaging device. In some cases: (a) each modality A image is a white light image and each modality B image is a fluorescent image; and (b) each expert label, computer vision label and union label indicates either presence of, or absence of, gingivitis. Each of the cases described above in this paragraph is an example of the system described in the first sentence of this paragraph, and is also an example of an embodiment of this invention that may be combined with other embodiments of this invention.

In some implementations, this invention is an article of manufacture comprising a non-transitory, machine-accessible medium having instructions encoded thereon: (i) for enabling one or more computers to perform the operations of (i) acquiring a set of union-labeled modality A images, in such a way that for each specific union-labeled image in the set, the one or more computers (A) output an instruction for a modality A imaging device to capture a modality A image, (B) output an instruction for a modality B imaging device to capture a modality B image, (C) accept input, which input comprises expert labels for the modality A image, (D) apply the expert labels to the modality A image on a pixel-by-pixel basis, (E) perform a computer vision algorithm that applies the computer vision labels to the modality B image on a pixel-by-pixel basis, (F) perform registration of the modality A image and modality B image, and (G) compute, after the registration, union labels for the modality A image in such a way that, for each specific pixel of the modality A image, a union label for the specific pixel is a union of (I) the expert label for the specific pixel and (II) the computer vision label for a corresponding pixel of the modality B image, and (ii) for enabling the one or more computers to perform the operations of (A) training a classifier on the set of union-labeled modality A images, and (B) after the training, to calculate, with the classifier, union labels for a previously unseen modality A image, on a pixel-by-pixel basis. In some cases: (a) each modality A image is a white light image and each modality B image is a fluorescent image; and (b) each expert label, computer vision label and union label indicates either presence of, or absence of, dental plaque. In some cases, each union-labeled image in the set captures a different physical object or different region of a physical object than that which is captured in each other union-labeled image in the set. In some cases, for each particular union-labeled modality A image in the set: (a) the particular union-labeled modality A image is an image of tissue before the tissue has been stained, and (b) a modality B image, which corresponds to the union-labeled modality A image, is an image of the tissue after the tissue has been stained. In some cases, the modality A imaging device and the modality B imaging device are each a tomographic imaging device. In some cases: (a) the modality A imaging device is a positron emission tomography imaging device; and (b) the modality B imaging device is an x-ray computed tomography imaging device. In some cases: (a) each modality A image is a white light image and each modality B image is a fluorescent image; and (b) each expert label, computer vision label and union label indicates either presence of, or absence of, gingivitis. Each of the cases described above in this paragraph is an example of the article of manufacture described in the first sentence of this paragraph, and is also an example of an embodiment of this invention that may be combined with other embodiments of this invention.

In some implementations, this invention is a method comprising participating in a download of software, either as a computer providing the software or as a computer receiving the software, wherein the software comprises instructions: (i) for enabling one or more computers to perform the operations of (i) acquiring a set of union-labeled modality A images, in such a way that for each specific union-labeled image in the set, the one or more computers (A) output an instruction for a modality A imaging device to capture a modality A image, (B) output an instruction for a modality B imaging device to capture a modality B image, (C) accept input, which input comprises expert labels for the modality A image, (D) apply the expert labels to the modality A image on a pixel-by-pixel basis, (E) perform a computer vision algorithm that applies the computer vision labels to the modality B image on a pixel-by-pixel basis, (F) perform registration of the modality A image and modality B image, and (G) compute, after the registration, union labels for the modality A image in such a way that, for each specific pixel of the modality A image, a union label for the specific pixel is a union of (I) the expert label for the specific pixel and (II) the computer vision label for a corresponding pixel of the modality B image, and (ii) for enabling the one or more computers to perform the operations of (A) training a classifier on the set of union-labeled modality A images, and (B) after the training, to calculate, with the classifier, union labels for a previously unseen modality A image, on a pixel-by-pixel basis. In some cases: (a) each modality A image is a white light image and each modality B image is a fluorescent image; and (b) each expert label, computer vision label and union label indicates either presence of, or absence of, dental plaque. In some cases, each union-labeled image in the set captures a different physical object or different region of a physical object than that which is captured in each other union-labeled image in the set. In some cases, for each particular union-labeled modality A image in the set: (a) the particular union-labeled modality A image is an image of tissue before the tissue has been stained, and (b) a modality B image, which corresponds to the union-labeled modality A image, is an image of the tissue after the tissue has been stained. In some cases, the modality A imaging device and the modality B imaging device are each a tomographic imaging device. In some cases: (a) the modality A imaging device is a positron emission tomography imaging device; and (b) the modality B imaging device is an x-ray computed tomography imaging device. In some cases: (a) each modality A image is a white light image and each modality B image is a fluorescent image; and (b) each expert label, computer vision label and union label indicates either presence of, or absence of, gingivitis. Each of the cases described above in this paragraph is an example of the method described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the features (including hardware, hardware components, methods, processes, steps, software, algorithms, features, or technology) that are described herein.

What is claimed:

1. A method comprising:
   (a) creating a set of union-labeled modality A images in such a way that each union-labeled image in the set is created by
      (i) capturing a modality A image,
      (ii) capturing a modality B image,
      (iii) accepting input, which input comprises expert labels for the modality A image,
      (iv) applying the expert labels to the modality A image on a pixel-by-pixel basis,
      (v) performing a computer vision algorithm that applies computer vision labels to the modality B image on a pixel-by-pixel basis,
      (vi) performing registration of the modality A image and modality B image, and
      (vii) after the registration, computing union labels for the modality A image in such a way that, for each specific pixel of the modality A image, a union label for the specific pixel is a union of (A) the expert label for the specific pixel and (B) the computer vision label for a corresponding pixel of the modality B image;
   (b) training a classifier on at least the set of union-labeled modality A images; and
   (c) after the training, calculating, with the classifier, union labels for a previously unseen modality A image, on a pixel-by-pixel basis.

2. The method of claim 1, wherein each modality A image is a white light image and each modality B image is a fluorescent image.

3. The method of claim 1, wherein each modality A image and each modality B image is an image of all or a portion of one or more teeth.

4. The method of claim 1, wherein each expert label, computer vision label and union label indicates either presence of, or absence of, dental plaque.

5. The method of claim 1, wherein each expert label, computer vision label and union label indicates either presence of, or absence of, gingivitis.

6. The method of claim 1, wherein each modality A image and each modality B image is a tomographic image.

7. The method of claim 1, wherein each union-labeled image in the set captures a different physical object or different region of a physical object than that which is captured in each other union-labeled image in the set.

8. A method comprising:
   (a) creating a set of union-labeled modality A images in such a way that each union-labeled image in the set is created by
      (i) capturing a modality A image,
      (ii) capturing a modality B image,
      (iii) applying initial labels to the modality A image on a pixel-by-pixel basis,
      (iv) applying initial labels to the modality B image on a pixel-by-pixel basis,
      (v) performing registration of the modality A image and modality B image, and
      (vi) after the registration, computing union labels for the modality A image in such a way that, for each specific pixel of the modality A image, a union label for the specific pixel is a union of (A) the initial label for the specific pixel and (B) the initial label for a corresponding pixel of the modality B image;
   (b) training a classifier on at least the set of union-labeled modality A images; and
   (c) after the training, calculating, with the classifier, union labels for a previously unseen modality A image, on a region-by-region basis.

9. The method of claim 8, wherein each union-labeled image in the set captures a different physical object or different region of a physical object than that which is captured in each other union-labeled image in the set.

10. The method of claim 8, wherein, for each particular union-labeled modality A image in the set:

(a) the particular union-labeled modality A image is an image of tissue before the tissue has been stained, and
(b) a modality B image, which corresponds to the union-labeled modality A image, is an image of the tissue after the tissue has been stained.

11. The method of claim 8, wherein, for each particular union-labeled modality A image in the set:
(a) the particular union-labeled modality A image is an image of tissue before the tissue has been stained by hematoxylin and eosin (H&E) stain, and
(b) a modality B image, which corresponds to the union-labeled modality A image, is an image of the tissue after the tissue has been stained by H&E stain.

12. The method of claim 8, wherein each modality A image and each modality B image is a tomographic image.

13. The method of claim 8, wherein:
(a) each modality A image is a positron emission tomography image; and
(b) each modality B image is a magnetic resonance imaging image.

14. The method of claim 8, wherein:
(a) each modality A image is a positron emission tomography image; and
(b) each modality B image is an x-ray computed tomography image.

15. A system comprising:
(a) a modality A imaging device;
(b) a modality B imaging device; and
(c) one or more computers;
wherein
(i) the one or more computers are programmed to acquire a set of union-labeled modality A images, in such a way that for each specific union-labeled image in the set, the one or more computers are programmed
(A) to output an instruction for the modality A imaging device to capture a modality A image,
(B) to output an instruction for the modality B imaging device to capture a modality B image,
(C) to accept input, which input comprises expert labels for the modality A image,
(D) to apply the expert labels to the modality A image on a pixel-by-pixel basis,
(E) to perform a computer vision algorithm that applies the computer vision labels to the modality B image on a pixel-by-pixel basis,
(F) to perform registration of the modality A image and modality B image, and
(G) to compute, after the registration, union labels for the modality A image in such a way that, for each specific pixel of the modality A image, a union label for the specific pixel is a union of (I) the expert label for the specific pixel and (II) the computer vision label for a corresponding pixel of the modality B image, and
(ii) the one or more computers are programmed
(A) to train a classifier on the set of union-labeled modality A images; and
(B) after the training, to calculate, with the classifier, union labels for a previously unseen modality A image, on a pixel-by-pixel basis.

16. The system of claim 15, wherein:
(a) each modality A image is a white light image and each modality B image is a fluorescent image; and
(b) each expert label, computer vision label and union label indicates either presence of, or absence of, dental plaque.

17. The system of claim 15, wherein each union-labeled image in the set captures a different physical object or different region of a physical object than that which is captured in each other union-labeled image in the set.

18. The system of claim 15, wherein, for each particular union-labeled modality A image in the set:
(a) the particular union-labeled modality A image is an image of tissue before the tissue has been stained, and
(b) a modality B image, which corresponds to the union-labeled modality A image, is an image of the tissue after the tissue has been stained.

19. The system of claim 15 wherein the modality A imaging device and the modality B imaging device are each a tomographic imaging device.

20. The system of claim 15, wherein:
(a) each modality A image is a white light image and each modality B image is a fluorescent image; and
(b) each expert label, computer vision label and union label indicates either presence of, or absence of, gingivitis.

* * * * *